(12) United States Patent
Kaneko et al.

(10) Patent No.: US 9,152,896 B2
(45) Date of Patent: Oct. 6, 2015

(54) IMAGE FORMING APPARATUS AND IMAGE FORMING METHOD

(71) Applicants: Satoshi Kaneko, Kanagawa (JP); Shuji Hirai, Tokyo (JP); Shinichi Akatsu, Kanagawa (JP); Shingo Suzuki, Kanagawa (JP); Tetsuya Muto, Kanagawa (JP); Keita Gotoh, Kanagawa (JP); Yuuichiroh Uematsu, Kanagawa (JP); Hitoshi Ishibashi, Kanagawa (JP)

(72) Inventors: Satoshi Kaneko, Kanagawa (JP); Shuji Hirai, Tokyo (JP); Shinichi Akatsu, Kanagawa (JP); Shingo Suzuki, Kanagawa (JP); Tetsuya Muto, Kanagawa (JP); Keita Gotoh, Kanagawa (JP); Yuuichiroh Uematsu, Kanagawa (JP); Hitoshi Ishibashi, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 7 days.

(21) Appl. No.: 14/202,563

(22) Filed: Mar. 10, 2014

(65) Prior Publication Data
US 2014/0268242 A1    Sep. 18, 2014

(30) Foreign Application Priority Data
Mar. 14, 2013 (JP) .................. 2013-051280

(51) Int. Cl.
*G06K 15/02* (2006.01)
*G06K 15/14* (2006.01)
*B41J 29/393* (2006.01)
*H04N 1/60* (2006.01)
*G03G 15/00* (2006.01)
G03G 15/01 (2006.01)

(52) U.S. Cl.
CPC ........... *G06K 15/1881* (2013.01); *B41J 29/393* (2013.01); *G03G 15/5058* (2013.01); *G06K 15/027* (2013.01); *G06K 15/14* (2013.01); *H04N 1/6033* (2013.01); *G03G 15/0189* (2013.01)

(58) Field of Classification Search
CPC ............................... G06K 15/02; G06K 15/14
See application file for complete search history.

(56) References Cited

U.S. PATENT DOCUMENTS

| | | | |
|---|---|---|---|
| 2004/0057062 A1* | 3/2004 | Harada et al. | 358/1.9 |
| 2012/0201552 A1 | 8/2012 | Hirai et al. | |
| 2013/0108288 A1 | 5/2013 | Kaneko et al. | |
| 2013/0108292 A1 | 5/2013 | Suzuki et al. | |
| 2013/0243456 A1* | 9/2013 | Kaneko et al. | 399/48 |
| 2013/0243457 A1 | 9/2013 | Kaneko et al. | |

FOREIGN PATENT DOCUMENTS

| | | |
|---|---|---|
| JP | 9-062042 | 3/1997 |
| JP | 10-326031 | 12/1998 |
| JP | 2000-098675 | 4/2000 |

(Continued)

*Primary Examiner* — Sarah Al Hashimi
(74) *Attorney, Agent, or Firm* — Oblon, McClelland, Maier & Neustadt, L.L.P.

(57) ABSTRACT

An image forming apparatus includes an image density detector, an image forming device, a rotator, an image density controller, and a timing correction data obtainer. The image density detector detects a toner density of an image formed on an image bearing member. An image forming device forms the image using a density adjustable element that adjusts the density of the image. The rotator forms an image pattern while the density adjustable element is changed, and a density thereof is detected by the image density detector. The image density controller controls the image forming device using a density correction data for the density adjustable element corresponding to a rotational period of the rotator. The timing correction data obtainer obtains timing correction data for correction of driving timing of the image forming device based on a change in the density of the image pattern detected by the image density detector.

11 Claims, 18 Drawing Sheets

(56) References Cited

FOREIGN PATENT DOCUMENTS

| JP | 2001-188391 | 7/2001 |
|----|-------------|--------|
| JP | 2004-061837 | 2/2004 |
| JP | 2004-109483 | 4/2004 |
| JP | 2005-049425 | 2/2005 |
| JP | 2005-062357 | 3/2005 |
| JP | 2010-079054 | 4/2010 |

* cited by examiner

INPUT SIGNAL OUT (t) = Amp·sin {ω (t + tl)}

SINE WAVE DELEYED BY "td" IS MEASURED

BEFORE AVERAGING

AFTER AVERAGING

DOT FORM

LINE FORM

CHANGES IN DUTY AND BIAS

IMAGE FORMING APPARATUS AND IMAGE FORMING METHOD

CROSS-REFERENCE TO RELATED APPLICATIONS

This patent application is based on and claims priority pursuant to 35 U.S.C. §119 to Japanese Patent Application No. 2013-051280, filed on Mar. 14, 2013, in the Japan Patent Office, the entire disclosure of which is hereby incorporated by reference herein.

BACKGROUND

1. Technical Field

Exemplary aspects of the present disclosure generally relate to an image forming apparatus, such as a copier, a facsimile machine, a printer, or a multi-functional system including at least one of these functions, and more particularly to, an image forming apparatus capable of detecting a density of an image and an image forming method.

2. Description of the Related Art

There have been known image forming apparatuses using electrophotography in which an image is formed using toner. The known image forming apparatuses, such as copiers, facsimile machines, printers, or multi-functional systems having at least one of copying, printing, scanning, and facsimile capabilities, typically form an image on a recording medium according to image data. Thus, for example, a charger uniformly charges a surface of an image bearing member (which may, for example, be a photosensitive drum); an optical writer projects a light beam onto the charged surface of the image bearing member to form an electrostatic latent image on the image bearing member according to the image data; a development device supplies toner to the electrostatic latent image formed on the image bearing member to render the electrostatic latent image visible as a toner image; the toner image is directly transferred from the image bearing member onto a recording medium or is indirectly transferred from the image bearing member onto a recording medium via an intermediate transfer member; a cleaning device then cleans the surface of the image carrier after the toner image is transferred from the image carrier onto the recording medium; finally, a fixing device applies heat and pressure to the recording medium bearing the unfixed toner image to fix the unfixed toner image on the recording medium, thus forming the image on the recording medium.

In recent years, such image forming apparatuses have spread throughout printing industries, and demand for higher output speed and higher image quality has been increasing rapidly. The demand for higher image quality includes a strong demand for density uniformity within a page, i.e., uniformity in density of an image formed on a recording medium, such as a sheet of paper. Uniform density within a page has become one criterion that users use to select an image forming apparatus. It is therefore important to minimize uneven density in a page.

Uneven density is caused by various elements, such as uneven charging of the image baring member due to non-uniform charging, uneven exposure by the exposure device, uneven rotation or uneven sensitivity of the image bearing member such as a photosensitive member, uneven resistance of a developer bearing member such as a development roller, uneven charging of toner, and uneven transfer by a transfer roller, for example. Uneven density attributed to, among other things, the uneven rotation or uneven sensitivity of the image bearing member particularly occurs at relatively short intervals, and thus periodically occurs within a page and is easily noticeable, which is often the cause of a complaint. It is therefore particularly important to suppress uneven density attributed to the uneven rotation or uneven sensitivity of the image bearing member.

The above-described varieties of uneven density will now be described in detail.

Uneven density attributed to the uneven rotation of the image bearing member will be described first. In the electrophotographic image forming apparatus, an electric field generated by the potential difference between the developer bearing member and the image bearing member causes toner to adhere to an outer circumferential surface of the image bearing member, to form an image. The uneven rotation of the image baring member, therefore, changes a development gap between the image baring member and the developer bearing member, resulting in a change in the electric field and thus a change in image density.

Meanwhile, uneven density attributed to the uneven sensitivity of the image bearing member occurs as follows. If the sensitivity of the image bearing member to exposure varies over time or due to a change in ambient conditions, even when the image bearing member is exposed at a constant level, there will be a difference in a bright portion potential, which is a potential of the image bearing member after exposure. As a result, the electric field fluctuates and hence the density changes, resulting in uneven density. Reducing the changes in the sensitivity of the image bearing member by using a highly accurate manufacturing method leads to a higher cost which complicates efforts to reduce the manufacturing cost.

In order to correct uneven density, process parameters including a charging bias, a development bias, exposure conditions may be changed based on a profile of uneven density which changes according to the rotational period of the image bearing member and uneven sensitivity. For example, image patterns for detection of uneven density are formed to create correction data for each process parameter.

According to this method, the development bias is modulated in accordance with the rotational period of the image bearing member, for example. More specifically, in this method, a rotational position detector for detecting the rotational position of the image bearing member and a density detector for detecting the density of the image are employed. According to this method, uneven density detected by the density detector is divided by the rotational period of the image bearing member, and the development bias is periodically changed with the use of the signal of the rotational position detector as a trigger, such that the change of the electric field due to elements such as the uneven rotation of the image bearing member is canceled to stabilize the electric field and thereby suppress the detected uneven density.

In this method, not only the development bias, but also the charging bias may be modulated.

Meanwhile, uneven density attributed to the uneven sensitivity of the image bearing member occurs as follows.

The sensitivity of the toner adhesion amount to the electric field changes in accordance with the image density. That is, the sensitivity of the image bearing member to the electric field changes in accordance with the image density, thereby changing the sensitivity of the image bearing member. More specifically, in a shadow portion having a relatively high density, such as a solid image portion having a relatively large toner adhesion amount, a development potential (i.e., a potential difference between the development bias and the bright portion potential) is dominant. By contrast, in a halftone or highlighted image portion smaller in the toner adhesion amount than the shadow portion, a background potential (i.e., a potential difference between the development bias and the dark portion potential) is dominant. Herein, the dark portion potential refers to the potential of a non-exposed portion of the image bearing member.

If a parameter such as the development bias is controlled to correct uneven density in the shadow portion, therefore, the effect of the control is not achieved in the halftone or highlighted image portion, and uneven density is increased.

Furthermore, there is known a method in which uneven density appearing periodically as a streak in an image may be comprehensively reduced in an electrophotographic or electrostatic-recording image forming apparatus such as in JP-H09-062042-A. In this method, the image forming apparatus includes a first fluctuation data storage device which stores periodical density fluctuation data of the image density in advance and a first controller which controls an image forming condition on the basis of the density fluctuation data. According to this method, the first fluctuation data storage device stores density fluctuation data corresponding to at least one rotational period of the developer bearing member, and the first controller controls one of the charging voltage, the exposure light amount, the development voltage, and the transfer voltage to correct the density in accordance with the rotational period of the image bearing member.

Uneven density may be suppressed by another method focusing not on the rotational period of the image bearing member but on the rotational period of the developer bearing member such as in JP-2000-098675-A (JP-3825184-B). The method changes the development bias in accordance with the rotational period of the development roller to reduce uneven density in the image occurring cyclically with the rotational period of the development roller. More specifically, the method detects uneven density in image patterns formed on the image bearing member, and performs phase matching between the detected uneven density information and the rotation of the development roller, thereby controlling the development bias.

If the control target is limited to the development bias, however, it is highly possible that the image density correction works in the solid image but not in the halftone image.

In such a case, in addition to changing the development bias, the charging bias may be changed in accordance with the rotational period of the development roller. As described above, the method in which the image density in the halftone image is effectively corrected by changing the development bias and the charging bias in accordance with the rotational period of the development roller may be applied to correction of the image density in the halftone image by changing the development bias and the charging bias in accordance with the rotational period of the image bearing member.

If the uneven sensitivity of the image bearing member as mentioned above is caused by its own characteristics, the uneven sensitivity occurs with the rotational period of the image bearing member. Thus, changing the development bias and the charging bias in accordance with the rotational period of the image bearing member may suppress the uneven sensitivity.

Uneven density attributed to the uneven rotation and the uneven sensitivity of rotators, i.e., the image bearing member and the developer bearing member may be effectively corrected using the correction data for correcting image forming conditions such as the development bias and the charging bias cyclically with the rotational period of the image bearing member and the development bearing member.

In order to perform the correction, it is necessary to apply accurately the correction data created to correspond to the rotational period of the rotators at the phase at which the uneven density is canceled. For example, in a case in which a toner image detector reads the image patterns created for detection of the uneven density, and the correction data for correcting parameters such as the development bias and the charging bias to suppress the uneven density in the image patterns is created, it is preferable to obtain the following time information. That is, the time information refers to a time period from an operating point of the control of the development device and the charging device, that is, a position at which the development bias and the charging bias are applied, to the time at which the toner image detector detects the image patterns.

This is because even when the phase of the rotators is detected, if the layout distance between the operating point of the control and the toner image detector is not an integral multiple of the rotational period of the rotators, it is difficult to apply accurately the correction data in such a manner as to suppress the uneven density. The time information may be obtained by dividing the layout distance by the rotation speed of the rotators if the layout distance and the phase of the rotators are known.

Even when the time information is obtained, in reality, it is difficult to apply accurately the correction data in such a manner as to suppress the uneven density. As a result, desirable correction of the uneven density is not performed using the correction data.

The difference between a design value of the layout distance and the actual layout distance causes difficulty in correction of the uneven density. Taking the design value of the layout distance into consideration is not enough to accurately match the phase of the correction data with the phase of the uneven density. In an actual machine, due to accumulation of manufacturing tolerances and installation errors of parts, and parts variations, there is a discrepancy between the design layout distance and the target distance. As a result, there is a discrepancy between the time information obtained from the design value of the layout distance and the actual time information so that the position of generation of the uneven density on the rotator and the phase of the correction data, for example, a control table, do not correspond to each other, resulting in insufficient correction effects.

Another cause is a shift in the control table due to a delay in the response from a high-voltage power pack serving as a power source to apply the development bias and the charging bias. Because there is a delay in the response from the high-voltage power pack that outputs the development bias and the charging bias, the phase of the uneven density and the phase of the control table do not coincide with each other, hence resulting in insufficient correction effects. In general, when the rotational period is short, that is, when the frequency is high, the delay in the response is long.

Furthermore, without operating the actual machine, the substantial control operating point of the development bias and the charging bias cannot be determined. In other words, the substantial control operating point of the development bias cannot be determined when using a development device using a multi-stage roller development system and the like. The substantial control operating point of the charging bias also cannot be determined when using a scorotron charging method using a grid electrode. These control operating points are known only when the actual machine is operated. Therefore, it is difficult to know the layout distance based on the design control operating points. In view of the above, it is necessary to obtain the control points somehow. The same is true for a single-stage development roller and a charging method using a roller.

If only taking the layout position into account, it is difficult to accurately apply the correction data for the uneven density which is made to correspond to the rotational period of the rotators in such a manner as to suppress the uneven density.

In view of the above, there is demand for an image forming apparatus that can apply accurately correction data for uneven density corresponding to a rotational period of a rotator to suppress the uneven density.

Such a configuration is proposed, for example, in JP-2006-267486-A.

Conventionally, there is known a single-beam optical scanning device employed in, but not limited to, an image forming apparatus, such as a digital copier or a laser printer, in which a recording speed is increased by increasing a rotation speed of a polygon mirror serving as a deflector.

In view of the above, there is demand for a device capable of minimizing operational load.

SUMMARY

In view of the foregoing, in an aspect of this disclosure, there is provided a novel image forming apparatus including an image bearing member, a developer bearing member, a developer bearing member, an image density detector, an image forming device, a rotator, an image density controller, and a timing correction data obtainer. The image bearing member bears an image on a surface thereof. The developer bearing member supplies toner to the image on the image bearing member to develop the image with toner. The image density detector detects a density of toner in the image. The image forming device forms the image using a density adjustable element that adjusts the density of the image. The rotator forms an image pattern while the density adjustable element is changed, and a density of the image pattern is detected by the image density detector. The image density controller controls the image forming device using a density correction data for the density adjustable element corresponding to a rotational period of the rotator to obtain a uniform image density. The timing correction data obtainer obtains timing correction data for correction of driving timing of the image forming device based on a change in the density of the image pattern detected by the image density detector. As the image forming device is controlled by the image density controller using the density correction data, the density correction data is in a state in which the timing correction data obtained by the timing correction data obtainer is applied thereto.

According to another aspect, an image forming method includes bearing an image; bearing and supplying toner to the image; detecting a density of toner in the image; forming the image using a density adjustable element that adjusts the density of the image; forming an image pattern on a rotator while the density adjustable element is changed, a density of the image pattern being detected by the image density detector; controlling the forming the image using density correction data for the density adjustable element corresponding to a rotational period of the rotator to obtain a uniform image density; and obtaining timing correction data for correction of driving timing of the forming the image based on a change in the density of the image pattern detected by the detecting. As the forming the image is controlled by the controlling using the density correction data, the density correction data is in a state in which the timing correction data obtained by the obtaining is applied thereto.

The aforementioned and other aspects, features and advantages would be more fully apparent from the following detailed description of illustrative embodiments, the accompanying drawings and the associated claims.

BRIEF DESCRIPTION OF THE SEVERAL VIEWS OF THE DRAWINGS

A more complete appreciation of the disclosure and many of the attendant advantages thereof will be more readily obtained as the same becomes better understood by reference to the following detailed description of illustrative embodiments when considered in connection with the accompanying drawings, wherein.

DETAILED DESCRIPTION

Figure 1:
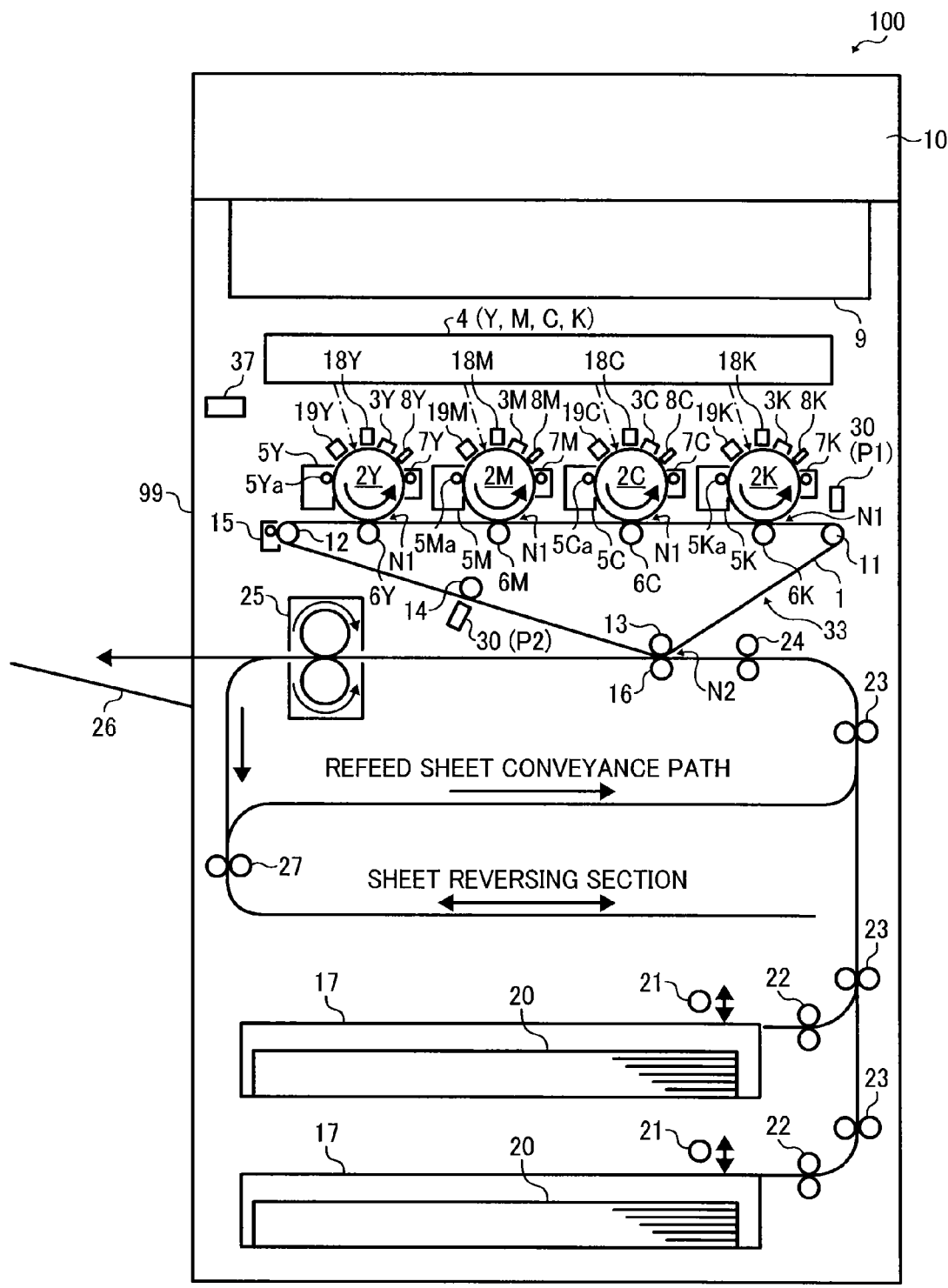
FIG. 1 is a schematic diagram illustrating an image forming apparatus according to an illustrative embodiment of the present disclosure.

A description is now given of illustrative embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of this disclosure.

In addition, it should be noted that the terminology used herein is for the purpose of describing particular embodiments only and is not intended to be limiting of this disclosure. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing illustrative embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

In a later-described comparative example, illustrative embodiment, and alternative example, for the sake of simplicity, the same reference numerals will be given to constituent elements such as parts and materials having the same functions, and redundant descriptions thereof omitted.

Typically, but not necessarily, paper is the medium from which is made a sheet on which an image is to be formed. It should be noted, however, that other printable media are available in sheet form, and accordingly their use here is included. Thus, solely for simplicity, although this Detailed Description section refers to paper, sheets thereof, paper feeder, etc., it should be understood that the sheets, etc., are not limited only to paper, but include other printable media as well.

Referring now to the drawings, wherein like reference numerals designate identical or corresponding parts throughout the several views, exemplary embodiments of the present patent application are described.

With reference to FIG. 1, a description is provided of an example of an image forming apparatus according to an illustrative embodiment of the present disclosure.

The image forming apparatus shown in FIG. 1 is an example of an electrophotographic full-color image forming apparatus using a tandem-type intermediate transfer method in which four photosensitive members are arranged in tandem. However, the image forming apparatus is not limited thereto. Alternatively, the image forming apparatus may be of a full-color, tandem-type direct transfer method with four photosensitive members and of a single-drum intermediate transfer method. Furthermore, the image forming apparatus may be a monochrome image forming apparatus using a single-drum, direct transfer method.

As illustrated in FIG. 1, an image forming apparatus 100 includes an intermediate transfer belt 1 as an image bearing member formed into an endless loop. The image forming apparatus 100 includes four drum-type photosensitive members (hereinafter referred to simply as photosensitive drums) 2Y, 2M, 2C, and 2K, each of which serves as a latent image bearing member for forming color images of yellow (Y), cyan (C), magenta (M), and black (K), respectively. The photosensitive drums 2Y, 2M, 2C, and 2K are arranged in tandem along a stretched surface of the intermediate transfer belt 1.

It is to be noted that the suffixes Y, M, C, and K denote colors yellow, magenta, cyan, and black, respectively. These suffixes may be omitted unless otherwise specified. A description is provided of image formation in an image forming station for yellow as a representative example of image forming stations. The photosensitive drum 2Y is surrounded by the following devices. The photosensitive drum 2Y is surrounded by a charging device 3Y, a photo interrupter 18Y, an optical writing device 4, a surface potential detector 19Y, a development device 5Y, a primary transfer roller 6Y, a photosensitive drum cleaning device 7Y, a charge remover QL8Y, and so forth. The photo interrupter 18Y is a rotational position detector that detects a rotational position, that is, a phase, of the photosensitive drum 2Y. The optical writing device 4 is an exposure device that exposes the photosensitive drum 2Y to write an electrostatic latent image on the surface of the photosensitive drum 2Y. The surface potential detector 19Y is a potential detector to detect a surface potential of the photosensitive drum 2Y. The primary transfer roller 6Y serves as a primary transfer device. The photosensitive drum cleaning device 7Y is a cleaning device for the photosensitive drum 2Y and includes a blade and a brush. The charge remover QL8Y is a quenching lamp.

The photosensitive drum 2Y, the charging device 3Y, the optical writing device 4Y, the development device 5Y, the primary transfer roller 6Y, and so forth constitute the image forming station as a toner image forming assembly for the color yellow. The image forming stations for other colors have the same configuration as the image forming station for yellow, differing only in the color of toner employed.

The intermediate transfer belt 1 is rotatably entrained about a plurality of support rollers 11, 12, and 13. A belt cleaning device 15 is disposed opposite the support roller 12 via the intermediate transfer belt 1. The belt cleaning device 15 includes a blade and a brush to clean the surface of the intermediate transfer belt 1. The intermediate transfer belt 1, the support rollers 11 through 13, and the belt cleaning device 15 constitute an intermediate transfer assembly 33.

A secondary transfer roller 16 serving as a transfer device is disposed opposite the support roller 13 via the intermediate transfer belt 1.

A scanner 9 as an image reading device, an auto document feeder (ADF) 10 as an automatic document feeding device, and so forth are disposed above the optical writing devices 4Y, 4C, 4M, and 4K, one for each of the colors yellow, cyan, magenta, and black, respectively.

Sheet cassettes 17 storing a stack of recording sheets 20 as recording media are disposed at a lower portion of a main body 99 of the image forming apparatus 100.

The uppermost recording sheet 20 in the stack of sheets stored in the sheet cassette 17 is picked up by a pickup roller 21, is fed by a sheet feed roller 22, and is conveyed by a pair of conveyor rollers 23. The recording sheet 20 is delivered in a predetermined timing to a secondary transfer nip N2, which is a secondary transfer portion at which the intermediate transfer belt 1 and the secondary transfer roller 16 face each other. The recording sheet 20 is sent to the secondary transfer nip N2 in appropriate timing by a pair of registration rollers 24.

Downstream from the nip portion N2 in the direction of conveyance of the recording sheet, a fixing device 25 is disposed.

As illustrated in FIG. 1, the image forming apparatus 100 includes a sheet output tray 26, a pair of switchback rollers 27, and a controller 37 including a central processing unit (CPU), a nonvolatile memory, and a volatile memory.

The development devices 5Y, 5C, 5M, and 5K include development rollers 5Ya, 5Ca, 5Ma, and 5Ka, respectively. Each of the development rollers 5Ya, 5Ca, 5Ma, and 5Ka as a rotary, developer bearing member is disposed opposite a respective one of the photosensitive drums 2Y, 2C, 2M, and 2K, with a certain gap, i.e., a development gap therebetween. The development rollers 5Ya, 5Ca, 5Ma, and 5Ka carry a two-component developing agent consisting of toner and carrier in the development devices 5Y, 5C, 5M, and 5K. The toner included in the two-component developer is adhered to the photosensitive drums 2Y, 2C, 2M, and 2K at a development nip at which the photosensitive drums 2Y, 2C, 2M, and 2K and the development rollers 5Ya, 5Ca, 5Ma, and 5Ka face each other, thereby forming a toner image on each of the photosensitive drums 2Y, 2C, 2M, and 2K.

Figure 4:
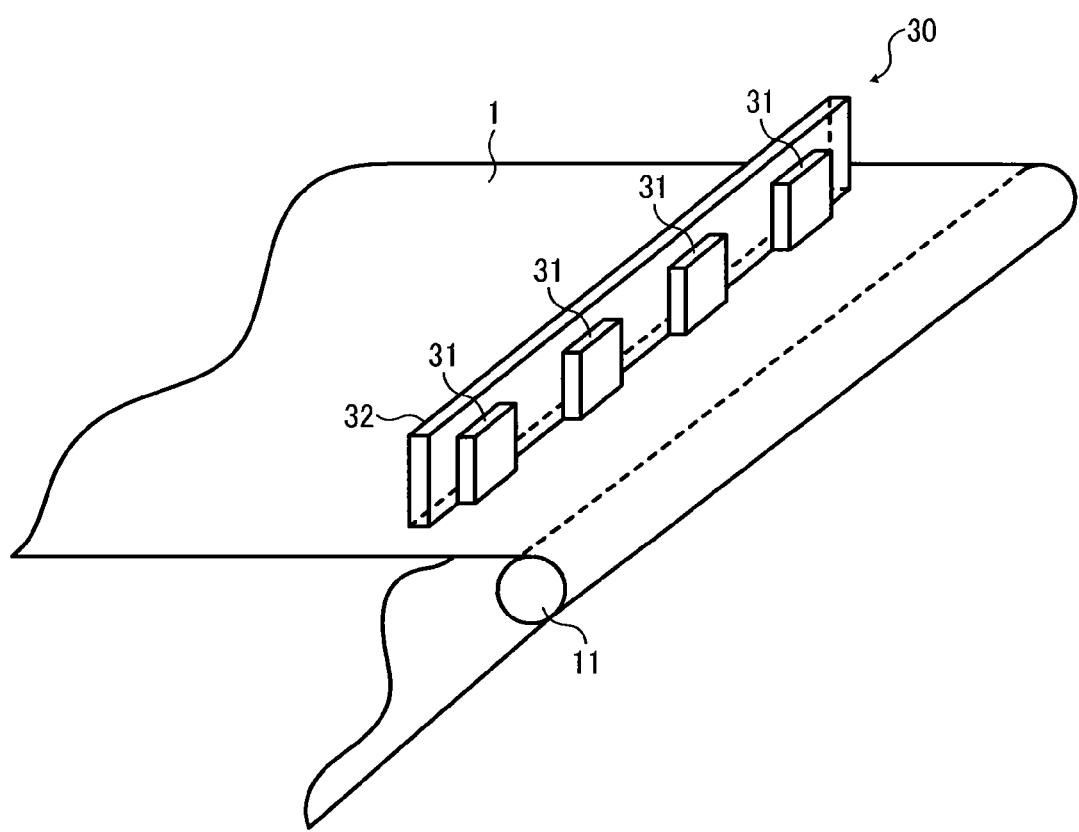
FIG. 4 is a perspective view schematically illustrating an image density detector employed in the image forming apparatus of FIG. 1.

The photo interrupters 18Y, 18C, 18M, and 18K may employ a known photo interrupter such as shown in FIG. 4 of JP-2000-098675-A. In the present illustrative embodiment, the photo interrupters 18Y, 18C, 18M, and 18K are employed as a detection mechanism to detect a rotational position of the photosensitive drums 2Y, 2C, 2M, and 2K. However, any other suitable devices such as a rotary encoder may be employed as long as a rotational position can be detected. Similarly, as long as the rotational position is detected, a rotational position detector for detecting a rotational position, in other words, a phase, of the development rollers 5Ya, 5Ca, 5Ma, and 5Ka may be other than photo interrupters.

Each of surface potential detectors 19Y, 19C, 19M, and 19K detects a potential of an electrostatic latent image on each surface of the photosensitive drums 2Y, 2C, 2M, and 2K written by the optical writing devices 4Y, 4C, 4M, and 4K. That is, the surface potential detectors 19Y, 19C, 19M, and 19K detect the surface potential of the photosensitive drums 2Y, 2C, 2M, and 2K before the electrostatic latent images on the photosensitive drums 2Y, 2C, 2M, or 2K are supplied with toner and developed.

The detected surface potential can be used for controlling a development bias of each of the development devices 5Y, 5C, 5K, and 5K. Furthermore, the detected surface potential is fed back to process conditions such as a charging bias of the charging devices 3Y, 3C, 3M, and 3K and laser powers of the optical writing devices 4Y, 4C, 4M, and 4K, and is used to maintain a stable image density.

Each of the optical writing devices 4Y, 4C, 4M, and 4K drives a semiconductor laser based on image information by way of a laser controller. Here, four semiconductor lasers are driven the laser controller. The optical writing devices 4Y, 4C, 4M, and 4K project four writing beams to illuminate each of the photosensitive drums 2Y, 2C, 2M, and 2K uniformly charged in the dark by the charging devices 3Y, 3C, 3M, and 3K. The optical writing devices 4Y, 4C, 4M, and 4K scan each of the photosensitive drums 2Y, 2C, 2M, and 2K in the dark with the writing beams so as to write an electrostatic latent image for the colors of yellow, cyan, magenta, and black on the surface of each of the photosensitive drums 2Y, 2C, 2M, and 2K.

In the present illustrative embodiment, the optical writing devices 4Y, 4C, 4M, and 4K scan the respective photosensitive drums with a laser beam emitted from the semiconductor laser. That is, in the optical writing devices 4Y, 4C, 4M, and 4K, the laser beam is deflected by a polygon mirror, and is reflected and directed onto an optical lens by a reflection mirror, thereby performing optical scanning. The optical writing device 4Y, 4C, 4M, and 4K may employ an LED array to perform optical scanning.

With reference to FIG. 1, a description is provided of image forming operation. Upon input of a print start command, each roller around the photosensitive drums 2Y, 2M, 2C, and 2K, around the intermediate transfer belt 1 and along the sheet conveyance path starts to rotate at a predetermined timing, and a recording sheet is started to be fed from the sheet cassette 17.

Meanwhile, each surface of the photosensitive drums 2Y, 2M, 2C, and 2K is charged uniformly by the respective charging devices 3Y, 3M, 3C, and 3K to the same electric potential, and is exposed, based on the image data for each image, by the writing beam projected from the optical writing devices 4Y, 4C, 4M, and 4K. A potential pattern after exposure is called an electrostatic latent image. The surface of the photosensitive drums 2Y, 2M, 2C, and 2K bearing the electrostatic latent image thereon is supplied with toner from the development devices 5Y, 5M, 5C, and 5K. Then, the electrostatic latent image borne on each of the photosensitive drums 2Y, 2M, 2C, and 2K is developed with a specific color.

In the structure as illustrated in FIG. 1, the photosensitive drums 2Y, 2M, 2C, and 2K are provided for each of the colors yellow, magenta, cyan, and black, respectively. (The order of arrangement of these colors may vary from system to system.) Accordingly, a toner image of yellow (Y), magenta (M), cyan (C), and black (K) is developed on the respective photosensitive drums 2Y, 2M, 2C, and 2K.

The photosensitive drums 2Y, 2M, 2C, and 2K and the intermediate transfer belt 1 contact each other to form a primary transfer nip N1 as a primary transfer section at which the developed toner images formed on the photosensitive drums 2Y, 2M, 2C, and 2K are transferred onto the intermediate transfer belt 1 in a manner described below. A primary transfer bias and pressure are applied to the primary transfer rollers 6Y, 6M, 6C, 6K disposed opposite the photosensitive drums 2Y, 2M, 2C, and 2K, thereby transferring the toner images onto the intermediate transfer belt 1 in the process known as primary transfer. The same primary transfer process is repeated for all the colors in appropriate timing. A full-color toner image is formed on the intermediate transfer belt 1 as the toner images are transferred onto the intermediate transfer belt 1 one atop the other at the primary transfer nip N1 in appropriate timing.

The recording sheet 20 delivered to the pair of registration rollers 24 is sent to the secondary transfer nip N2 in appropriate timing such that the recording sheet 20 is aligned with the full color toner image formed on the intermediate transfer belt 1. At this time, a secondary transfer bias and pressure are applied to the secondary transfer roller 16 in a process known as secondary transfer. The recording sheet 20 onto which a full color toner image has been transferred passes the fixing device 25 and the toner image borne on the recording sheet 20 is heated and fixed thereon.

If a target print is a one-sided print, the recording sheet 20 is directly conveyed to a sheet output tray 26. If the target print is a duplex print, the conveyance direction of the recording sheet 20 is changed upside down and the recording sheet 20 is conveyed to a sheet reversing section. Upon arrival of the recording sheet 20 at the sheet reversing section, the pair of switchback rollers 27 switches the direction of conveyance of the recording sheet 20 so that the recording sheet 20 comes out of the sheet reversing section from its trailing end thereof. This process is called a switchback operation, in which the recording sheet 20 is reversed. The reversed recording sheet 20 does not return to the fixing device 25, but passes through a re-feed conveyance path and joins the regular sheet conveyance path. Thereafter, similar to the transfer of the toner image in the one-sided print, the toner image is transferred onto the recording sheet 20 which then passes the fixing device 25 and is discharged outside. This is the duplex print operation.

Each of the photosensitive drums 2Y, 2M, 2C, and 2K having passed through the primary transfer nips N1 carries residual toner on a surface thereof after the primary transfer, and the residual toner is removed therefrom by the photosensitive drum cleaning devices 7Y, 7M, 7C, and 7K, respectively. Subsequently, residual charge remaining on the surface of each of the photosensitive drums 2Y, 2M, 2C, and 2K is uniformly removed by the charge removers QLs 8Y, 8M, 8C, and 8K, respectively, in preparation for the subsequent imaging cycle. The intermediate transfer belt 1 that has passed the secondary transfer nip N2 carries residual toner on a surface thereof after secondary transfer. The residual toner after secondary transfer is also removed therefrom by the belt cleaning device 15 in preparation for the subsequent imaging cycle. By repeating such operations, either one-sided print or duplex print is performed.

The image forming apparatus 100 includes a toner image detector 30 as a density detector to detect a density of the toner image formed on the outer circumferential surface of the intermediate transfer belt 1. In the present illustrative embodiment, the toner image detector 30 is an optical detector constituted of an optical sensor or the like.

The toner image detector 30 functions as a toner adhesion amount detector serving as an image density detector that detects an adhesion amount of toner on the intermediate transfer belt 1 to detect uneven density of the image.

The toner image detector 30 detects a density of image patterns formed on the surface of the intermediate transfer belt 1 for correction of uneven density.

According to the illustrative embodiment shown in FIG. 1, the toner image detector 30 is disposed at a position P1 upstream from the secondary transfer section (the secondary transfer nip N2) and opposite a portion of the intermediate transfer belt 1 entrained about the support roller 11. Alternatively, the toner image detector 30 may be disposed at a position P2 downstream from the secondary transfer nip N2 as shown in FIG. 1. In a case in which the toner image detector 30 is disposed at the position P2 downstream from the secondary transfer nip N2, preferably, a roller 14 is provided inside the loop of the intermediate transfer belt 1 to stop fluctuation of the intermediate transfer belt 1 and the toner image detector 30 is disposed facing the roller 14.

Among the two positions of the toner image detector 30 described above, the position P1 before secondary transfer coincides with a position at which the toner pattern on the intermediate transfer belt 1 is detected before the secondary transfer process. If no specific limitation exists in the machine layout, the toner image detector 30 is usually disposed at the position P1. Because the toner image detector 30 detects the toner image of the image pattern for correction control immediately after the toner image thereof is formed, there is a shorter waiting time and no need of passing the toner image as an image pattern through the nip N2. Therefore, no specific artifice is necessary.

However, because there are many image forming apparatuses in which the secondary transfer position such as the secondary transfer nip N2 is disposed immediately after the fourth-color image forming station (for example, the black station in FIG. 1), allocation of the toner image detector 30 at the position P1 is difficult due to the limited space. In such a case, the toner image detector 30 is disposed at the position P2 which is after the secondary transfer, and the toner image of the image pattern formed on the intermediate transfer belt 1 is passed through the nip N2. Then, the toner image detector 30 detects the density of the toner image after passing through the secondary transfer nip N2. There are possibly two ways to pass through the secondary transfer nip N2: separating the secondary transfer roller 16 from the intermediate transfer belt 1 or applying a reverse bias to the secondary transfer roller 16. The present embodiment is not limited to either way.

Figure 2:
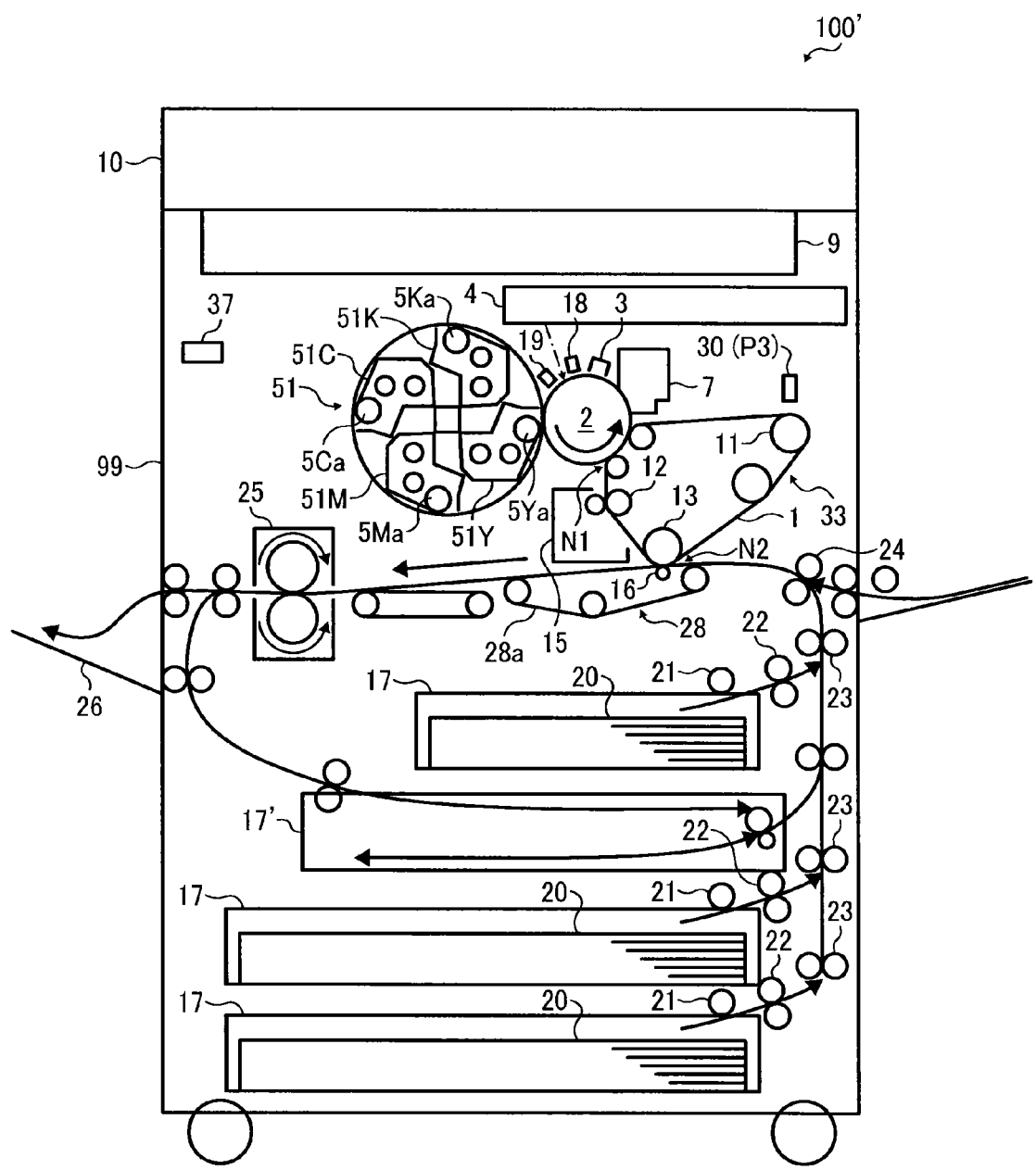
FIG. 2 is a schematic diagram illustrating another example of the image forming apparatus according to an illustrative embodiment of the present disclosure.

With reference to FIG. 2, a description is provided of another example of the image forming apparatus to which the present invention may be applied. In FIG. 2, it is to be noted that the same reference numerals used in FIG. 1 are provided to the similar or the same constituent elements in FIG. 2 when discrimination therebetween is not required, and a redundant description thereof will be omitted.

An image forming apparatus 100' shown in FIG. 2 is a full-color copier employing one-drum type intermediate transfer method including a photosensitive drum 2 as a drum-shaped image bearing member and a revolver development device 51 disposed opposite the photosensitive drum 2.

The revolver development device 51 includes four development devices 51Y, 51M, 51C, and 51K, each serving as a development mechanism and held by a retainer that rotates about a rotary shaft.

Each of the development devices 51Y, 51M, 51C, and 51K develops an electrostatic latent image on the photosensitive drum 2 by supplying color toner of yellow (Y), magenta (M), cyan (C), and black (K).

When the retainer of the revolver development device 51 is rotated, an arbitrary development device among the development devices 51Y, 51M, 51C, and 51K is moved to a development position opposite the photosensitive drum 2, so that the electrostatic latent image on the photosensitive drum 2 is developed in a color corresponding to the color of the arbitrary development device. When forming a full-color image, for example, electrostatic latent images for yellow, magenta, cyan, and black are sequentially formed on the photosensitive drum 2 while the intermediate transfer belt 1 formed into an endless loop rotates approximately four times and the electrostatic latent images on the photosensitive drum 2 are sequentially developed by the development devices 51Y, 51M, 51C, and 51K for the colors yellow, magenta, cyan, and black. Then, the toner images of the colors yellow, magenta, cyan, and black formed on the photosensitive drum 2 are transferred onto the intermediate transfer belt 1 at the primary nip N1 such that they are superimposed one atop the other.

The secondary transfer nip N2, at which the support roller 13 supporting the intermediate transfer belt 1 and the secondary transfer roller 16 of a secondary transfer unit 28 face each other, is a secondary transfer nip at which the intermediate transfer belt 1 and a transfer conveyance belt 28a of the secondary transfer unit 28 contact each other with a predetermined nip width. When the four-color composite toner image on the intermediate transfer belt 1 as described above passes through the secondary transfer nip N2, the four-color composite toner image on the intermediate transfer belt 1 is transferred onto the recording sheet 20 which has been conveyed by the transfer conveyance belt 28a of the secondary transfer unit 28 at an appropriate timing in sync with the passing of the four-color composite toner image.

When images are to be formed on both sides of the recording sheet 20, the recording sheet 20 which has passed the fixing device 25 is conveyed to a duplex print unit 17' and reversed. The reversed recording sheet 20 is re-fed to the secondary transfer nip N2, and the four-color composite toner image on the intermediate transfer belt 1 is transferred onto the reversed surface thereof in secondary transfer.

In the image forming apparatus 100' as illustrated in FIG. 2, the toner image detector 30 is disposed at a position P3 before the secondary transfer which is a position opposite the portion of the intermediate transfer belt 1 entrained around the roller 11.

Figure 3:
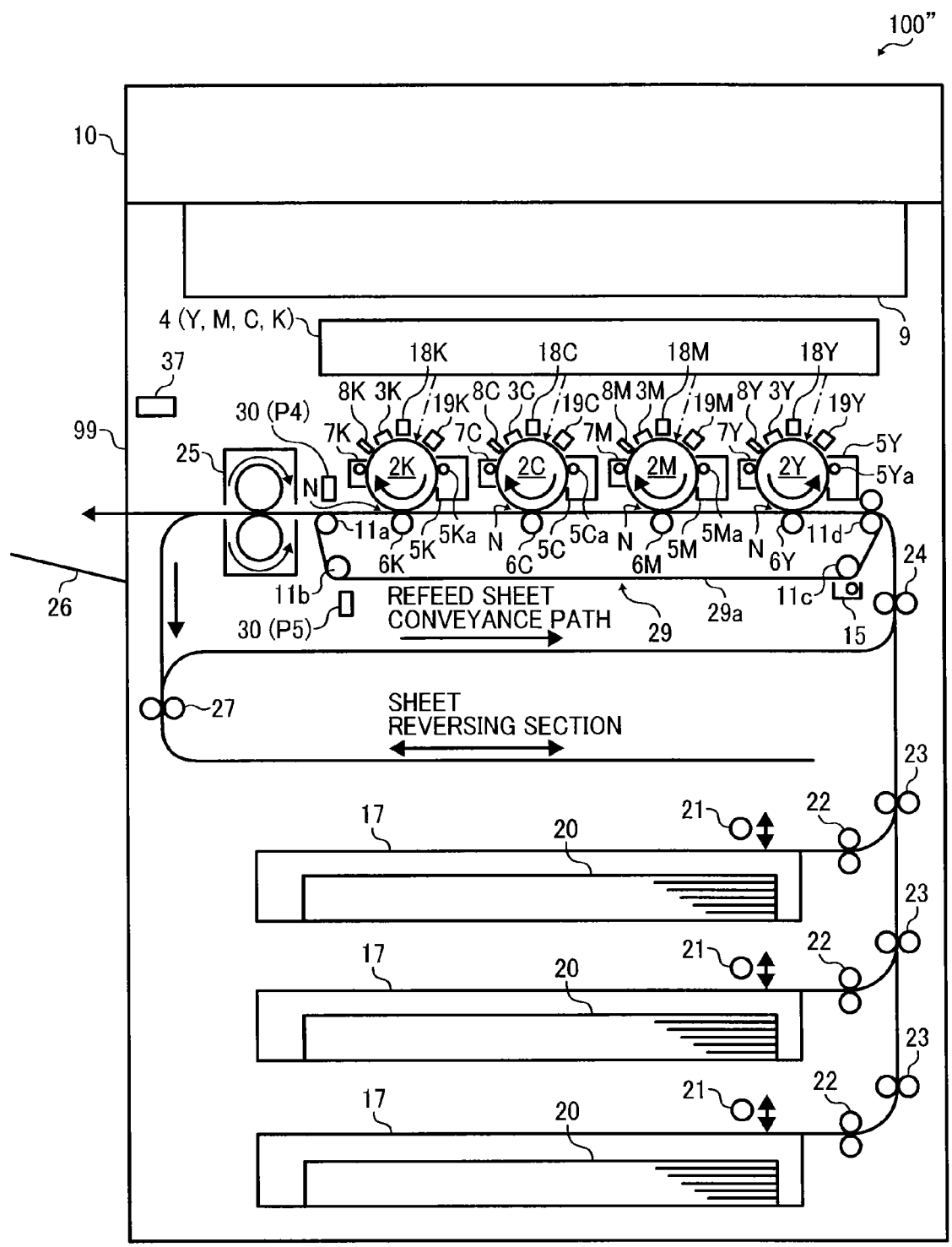
FIG. 3 is a schematic diagram illustrating still another example of the image forming apparatus according to an illustrative embodiment of the present disclosure.

With reference to FIG. 3, a description is provided of another example of the image forming apparatus to which the present invention is applied. In FIG. 3, it is to be noted that the same reference numerals used in FIG. 1 are provided to the similar or the same constituent elements in FIG. 3 when discrimination therebetween is not required, and a redundant description thereof will be omitted.

An image forming apparatus 100" illustrated in FIG. 3 represents a full-color copier employing a four-serial tandem type direct transfer method, including a transfer unit 29 disposed below four sets of image forming stations to transfer a toner image formed on the photosensitive drums 2Y, 2M, 2C, and 2K onto the recording sheet 20. The transfer unit 29 includes a transfer belt 29a formed into an endless loop and rotatably supported by a plurality of support rollers 11a to 11d. Specifically, the transfer belt 29a is entrained around a drive roller 11a and driven rollers 11b through 11d, is driven to rotate counterclockwise at a predetermined timing, and passes transfer positions N of each of the image forming stations while carrying the recording sheet 20 thereon.

The transfer rollers 6Y, 6M, 6C, and 6K are disposed inside the looped transfer belt 29 and supplied with a transfer charge at each transfer position N, thereby transferring the toner images from the photosensitive drums 2Y, 2M, 2C, and 2K onto the recording sheet 20.

In the image forming apparatus 100" illustrated in FIG. 3, when a full-color mode in which four-color composite image is formed is selected on a control panel, an image formation process in which a toner image of each color yellow, magenta, cyan, and black is formed on the respective photosensitive drums 2Y, 2M, 2C, and 2K of the image forming stations, is performed in sync with conveyance of the recording sheet 20.

Meanwhile, the recording sheet 20 supplied from the sheet cassette 17 is sent out by the pair of registration rollers 24 at a predetermined timing is carried by the transfer belt 29a and is conveyed so as to pass through the transfer position N of each image forming station. The recording sheet 20 onto which the toner images of each color have been transferred and hence a four-color composite toner image is formed thereon is delivered to the fixing device 25 in which the composite toner image is fixed onto the recording sheet 20. The recording sheet 20 is then discharged onto the sheet output tray 26.

In the image forming apparatus 100" as illustrated in FIG. 3, the toner image detector 30 is disposed at a position P4, before the fixation, which is a position downmost stream of the transfer unit 29 in the conveyance direction of the recording sheet and opposite the portion of the intermediate transfer belt 29a entrained around the roller 11a.

As illustrated in FIGS. 1 to 3, in each of the image forming apparatuses 100, 100', and 100", because the toner image of the image pattern for correction control is formed on the photosensitive drums 2Y, 2M, 2C, and 2K or the photosensitive drum 2 and is transferred onto the downstream intermediate transfer belt 1 or onto the transfer belt 28a or 29a, the toner image detector 30 can be disposed in such manner as to face the surface of each of the photosensitive drums 2Y, 2M, 2C, and 2K or the surface of the photosensitive drum 2. The place of installation of the toner image detector 30 in this case is between the development position by the development devices 5Y, 5M, 5C, and 5K or the revolver development device 51 and the nip N1 or the transfer position N at which the image is transferred onto the intermediate transfer belt 1 or the transfer conveyance belt 28a or 29a.

A description is now provided of correction of uneven density of an image based on the detection of the density of the image pattern in the image forming apparatuses 100, 100', and 100". In the correction control of uneven density, a so-called image pattern is formed for the correction control and the density of an image to be formed by a designation of a user is adjusted by using the image density of the image pattern to enhance image quality. Although a description is provided of implementation of the control in the image forming apparatus 100, similarly, the control can be implemented in the image forming apparatuses 100' and 100".

According to the present illustrative embodiment, there are substantially two kinds of image patterns for the correction control. The first image pattern for the correction control is an image pattern for calculation of correction parameters. More specifically, this image pattern is formed to obtain density correction data to obtain uniform image density of an image. The second image pattern for the correction control is an image pattern for detection of a phase shift. More specifically, this image pattern is formed to obtain timing correction data to properly apply the density correction data to suppress the uneven density of the image.

According to the present illustrative embodiment, in order to obtain uniform image density, elements that can adjust the image density include a development condition as a first element, i.e., a development bias, and a charging condition as a second element, i.e., a charging bias. Therefore, the image forming apparatus 100 is equipped with the development devices 5Y, 5M, 5C, and 5K as a first image forming device capable of adjusting the image density using the development bias which is the first element. Furthermore, the image forming apparatus 100 is equipped with the charging devices 3Y, 3C, 3M, and 3K as a second image forming device capable of adjusting the image density using the charging bias which is the second element.

According to the present illustrative embodiment, the image pattern for calculation of the correction parameters includes two types of image patterns, one for obtaining the density correction data for the development bias and another for obtaining the density correction data for the charging bias. Furthermore, the image pattern for detection of the phase shift also includes two types of image patterns, one for obtaining the density correction data for the development bias and another for obtaining the density correction data for the charging bias.

Thereafter, the image pattern for detection of the phase shift to obtain the timing correction data for the development bias is referred to as a first image pattern. The image pattern for detection of the phase shift to obtain the timing correction data for the charging bias is referred to as a second image pattern.

The image pattern for calculation of the correction parameters to obtain the density correction data for the development bias is referred to as a third image pattern. The image pattern for calculation of the correction parameters to obtain the density correction data for the charging bias is referred to as a fourth image pattern.

FIG. 4 is a partial perspective view schematically illustrating the toner image detector 30. More specifically, FIG. 4 shows an example position of the toner image detector 30 disposed at the position P1 before the secondary transfer in the image forming apparatus 100. The toner image detector 30 includes a detector substrate 32 and four optical detectors, i.e., detector heads 31 to detect a density of an image. In other words, the toner image detector 30 is a four-head type detector. Accordingly, the detector heads 31 are arranged along a main scanning direction perpendicular to the direction of conveyance of the recording sheet 20, that is, along an axial direction of the photosensitive drums 2Y, 2M, 2C, and 2K.

With such a configuration, a toner adhesion amount at four positions in the main scanning direction can be measured simultaneously, so that each detector head 31 can be used exclusively for each color. The number of the detector heads employed in the toner image detector 30 is not limited to four. The toner image detector 30 may include at least one detector head, or may include five or more detector heads.

Each detector head 31 is disposed opposite a detection target, i.e., the intermediate transfer belt 1 with a gap of approximately 5 mm with respect to the surface of the intermediate transfer belt 1. In the present illustrative embodiment, the toner image detector 30 is disposed in the vicinity of the intermediate transfer belt 1, and image formation conditions are determined based on the toner adhesion amount on the intermediate transfer belt 1. Furthermore, image formation timing is determined based on the toner adhering position on the intermediate transfer belt 1. However, the toner image detector 30 may be disposed opposite the photosensitive drums 2Y, 2M, 2C, and 2K, or may be disposed at a position opposite the transfer conveyance belt 28a as illustrated in FIG. 2 in such a manner as to face the recording sheet 20 onto which the toner image is transferred from the intermediate transfer belt 1.

In a case in which the toner image detector 30 is disposed opposite the photosensitive drums 2Y, 2M, 2C, and 2K, the toner image detector 30 is disposed downstream from the development position and upstream from the transfer position in the rotation direction of the photosensitive drums 2Y, 2M, 2C, and 2K while facing the photosensitive drums 2Y, 2M, 2C, and 2K.

An output from the toner image detector 30 is converted into a toner adhesion amount via the adhesion amount conversion algorithm exerted by the controller 37, which can store the obtained amount in the nonvolatile memory or volatile memory included in the controller 37 as an image density. Therefore, the controller 37 serves as an image density storage device. The controller 37 serving as the image density storage device stores the image density as time-series data. A known adhesion amount conversion algorithm is used in the present embodiment, and any known adhesion amount conversion algorithm will suffice. Thus, the description thereof is omitted herein.

The nonvolatile or volatile memory included in the controller 37 further stores various information such as outputs and correction data as well as control results from various detectors such as the surface potential detectors 19Y, 19C, 19M, and 19K and the photo interrupters 18Y, 18C, 18M, and 18K. The controller 37 stores the surface potential readings detected by the surface potential detectors 19Y, 19C, 19M, and 19K, and therefore, serves as a surface potential data storage device. The controller 37 stores the rotational positions of the photosensitive drums 2Y, 2M, 2C, and 2K detected by the photo interrupters 18Y, 18C, 18M, and 18K, and therefore, serves as a rotational position data storage device.

Figure 5A:
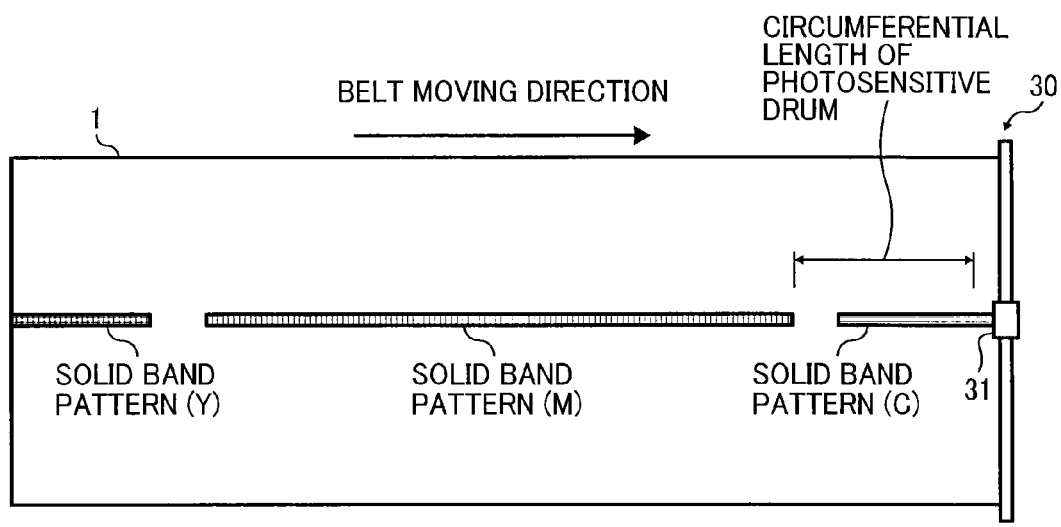
FIGS. 5A and 5B are schematic diagrams illustrating image patterns, the density of which is detected by the image density detector.
Figure 5B:
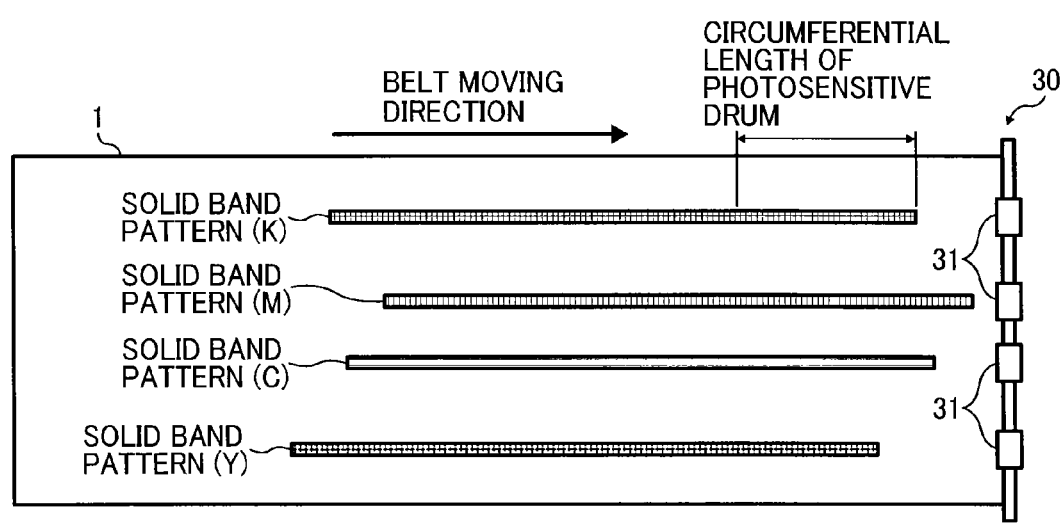

As illustrated in FIGS. 5A and 5B, the first through fourth image patterns are formed in a long band pattern in a moving direction of the intermediate transfer belt 1 for each of the colors yellow, cyan, magenta, and black. The image pattern for each color is formed in a similar or the same shape. The image pattern illustrated in FIGS. 5A and 5B is the third image pattern.

As illustrated in FIGS. 5A and 5B, only the third image pattern is formed in a solid band pattern so as to form a shadow portion with a high image density.

The first, second, and fourth image patterns are formed in a halftone band pattern with a lower image density than that of the third image pattern.

The third image pattern in the present illustrative embodiment is represented by a solid image; however, as long as fluctuations of the image density are detected, an image with less density can be used. The solid band pattern constituting the third image pattern refers to an image pattern with a high density within a detection sensitivity region of the toner image detector 30. In the present illustrative embodiment, the solid band pattern for each color yellow, cyan, and magenta has a high density, i.e., an image density of 100%. As for the solid band pattern for black, the image density thereof is approximately 70%.

The image density of the first, second, and fourth image patterns is approximately 40%.

The method to change the image density of the third image pattern, and the first, second and fourth image patterns may employ an area coverage modulation or an analogue method. These methods are described later.

The first and the second image patterns are formed to obtain the timing correction data for the development bias and the charging bias. Thus, when obtaining the timing correction data, initially, the first image pattern is formed, and subsequently, the second image pattern is formed on the intermediate transfer belt 1 at a position downstream from the first image pattern in the moving direction of the intermediate transfer belt 1.

The third and the fourth image patterns are formed to obtain the density correction data for the development bias and the charging bias. Thus, when obtaining the density correction data, initially, the third image pattern is formed, and subsequently, the fourth image pattern is formed on the intermediate transfer belt 1 at a position downstream from the third image pattern in the moving direction of the intermediate transfer belt 1.

As described above, the first through fourth image patterns are formed in a long band pattern along a horizontal (left-right) direction corresponding to a sub-scanning direction in FIGS. 5A and 5B. That is, the image patterns are long along the rotational direction of the photosensitive drums 2Y, 2M, 2C, and 2K. The length of the first through fourth image patterns in the sub-scanning direction corresponds to at least the circumferential length of the photosensitive drums 2Y, 2M, 2C, and 2K. In the present illustrative embodiment, the length of the first through fourth image patterns in the sub-scanning direction corresponds to three times the circumferential length of the photosensitive drums 2Y, 2M, 2C, and 2K.

The length of the image pattern is set as described above in order to adjust the image density in the image forming apparatus 100 to suppress uneven image density due to the uneven sensitivity of the photosensitive drums 2Y, 2M, 2C, and 2K and fluctuations in the size of the development gap between the photosensitive drums 2Y, 2M, 2C, and 2K and the development rollers 5Ya, 5Ca, 5Ma, and 5Ka.

The above point will now be described in more detail. An example of a cause of the change in the development gap is attributed to the uneven rotation of the photosensitive drums 2Y, 2M, 2C, and 2K. The cause of the uneven rotation thereof is attributed to positional deviation of the rotational center of the photosensitive drums 2Y, 2M, 2C, and 2K, for example. Uneven image density due to the change in the development gap, therefore, includes a rotation fluctuation component which occurs in accordance with the rotational period of the photosensitive drums 2Y, 2M, 2C, and 2K. To detect the rotation fluctuation component, the length of the image pattern in the sub-scanning direction is set to at least the circumferential length of the photosensitive drums 2Y, 2M, 2C, and 2K.

As will be described later in detail, the third image pattern is formed to obtain the density correction data for the development bias so as to suppress the uneven density caused by the fluctuation component. Therefore, the length of the third image pattern in the sub-scanning direction needs to correspond to the circumferential length of the photosensitive drums 2Y, 2M, 2C, and 2K.

As will be described later in detail, the fourth image pattern is formed to obtain the density correction data for the charging bias so as to suppress the uneven density caused by application of the density correction data for the development bias obtained by the third image pattern. Similarly, the length of the fourth image pattern in the sub-scanning direction needs to correspond to the circumferential length of the photosensitive drums 2Y, 2M, 2C, and 2K.

In order to obtain the density correction data, a later-described averaging processing is desirable. According to the illustrative embodiment, the length of the third image pattern and the fourth image pattern in the sub-scanning direction corresponds to three times the circumferential length of the photosensitive drums 2Y, 2M, 2C, and 2K. With this length, desired accuracy is achieved through the averaging processing, and furthermore, only a relatively small amount of toner is needed to form the third image pattern and the fourth image pattern.

With respect to the first and the second image patterns, in order to obtain the timing correction data, the averaging processing is desirable. According to the illustrative embodiment, the length of the first image and the second image patterns in the sub-scanning direction corresponds to three times the circumferential length of the photosensitive drums 2Y, 2M, 2C, and 2K. With this length, desired accuracy is achieved through the averaging processing, and furthermore, only a relatively small amount of toner is needed to form the first image pattern and the second image pattern.

The solid band patterns of the respective colors may be formed as illustrated in FIG. 5A or FIG. 5B, for example. In FIG. 5A, the solid band patterns of the respective colors are formed at the same position in the main scanning direction corresponding to the vertical direction in the drawing, i.e., in a direction perpendicular to the sub-scanning direction. This position corresponds to a detection area of the toner adhesion amount detector 30 in the main scanning direction. More specifically, this position corresponds to the position of the detector head 31. In FIG. 5A, this position corresponds to a central portion of the intermediate transfer belt 1 in the main scanning direction. However, the position is not limited thereto, and may correspond to an end portion of the intermediate transfer belt 1 in the main scanning direction.

In FIG. 5B, the solid band patterns of the respective colors are formed at different positions in the main scanning direction. These positions correspond to respective detection areas of the toner image detector 30 in the main scanning direction. More specifically, these positions correspond to the positions of the detector heads 31.

The configuration which forms the image patterns as illustrated in FIG. 5A is advantageous in that the image densities of the image patterns are detected by the single toner adhesion amount detector 31.

The configuration in which the image patterns of the respective colors are formed to overlap one another in the sub-scanning direction as illustrated in FIG. 5B is advantageous in that the time until the completion of detection of the image densities is reduced.

As described above, the toner image detector 30 may be provided for each of the photosensitive drums 2Y, 2M, 2C, and 2K to detect the densities of the respective images formed on the photosensitive drums 2Y, 2M, 2C, and 2K. This configuration eliminates the influence of a change in movement of the intermediate transfer belt 1. Alternatively, as described above, the toner image detector 30 may be provided facing the recording sheet 20 having the images transferred thereto from the intermediate transfer belt 1 to detect the densities of the images formed on the recording sheet 20. This configuration also eliminates the influence of a change in movement of the recording sheet 20.

To detect the above-described component of uneven image density, image formation conditions for forming the third image pattern, that is, elements for forming an image are kept constant. For example, the elements for forming an image, such as a charging condition of the charging devices 3Y, 3C, 3M, and 3K, an exposure condition (i.e., writing condition) of the optical writing devices 4Y, 4C, 4M, and 4K, a development condition of the development devices 5Y, 5M, 5C, and 5K, and a transfer condition of the primary transfer rollers 6Y, 6M, 6C, and 6K, and so forth are kept constant.

In the present illustrative embodiment, the charging condition includes the charging bias, the writing condition includes the intensity of the writing light, the development condition includes the development bias, and the transfer condition includes the transfer bias.

When forming the fourth image pattern, the density correction data for the development condition obtained by forming the third image pattern is applied. Accordingly, among the image formation conditions, the development condition changes in accordance with the density correction data while other image conditions are kept constant.

As will be described later in detail, when forming the first image pattern, in order to obtain the timing correction data for the development condition, the development condition is modulated actively while other image formation conditions are kept constant. As will be described later in detail, when forming the second image pattern, in order to obtain the timing correction data for the charging condition, the charging condition is modulated actively while other image formation conditions are kept constant.

Figure 7:
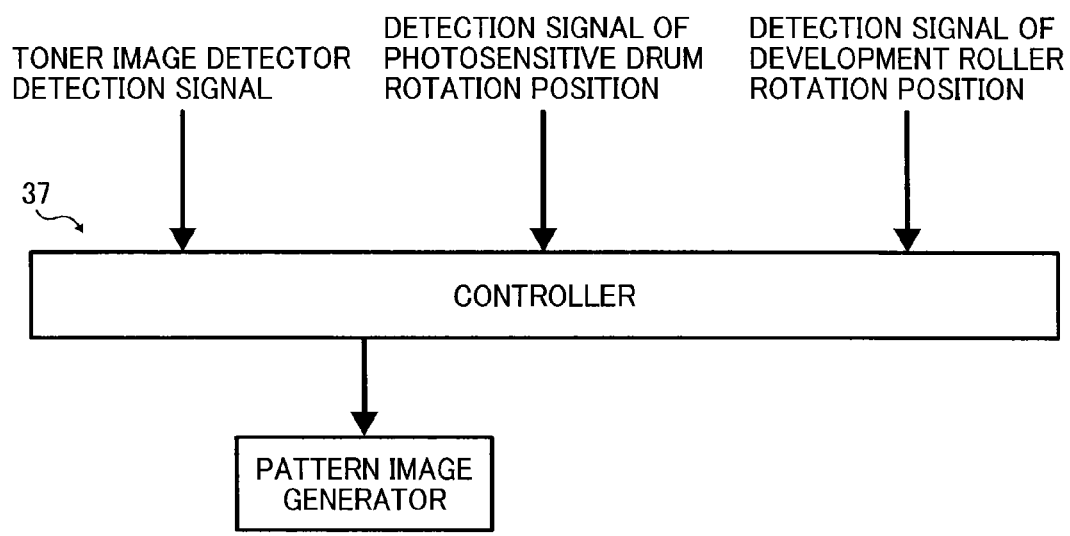
FIG. 7 is a control block diagram schematically illustrating formation of an image pattern based on the signals from the image density detector and the rotational position detector.

Devices such as the charging devices 3Y, 3C, 3M, and 3K, the optical writing devices 4Y, 4C, 4M, and 4K, the development devices 3Y, 3C, 3M, and 3K, the primary transfer rollers 6Y, 6M, 6C, and 6K perform a series of electrophotographic image forming processes, such as development, charging, and exposure to form the image patterns and hence function as image pattern formation devices as illustrated in FIG. 7.

If a solid image is formed under constant image formation conditions, the density of the solid image is uniform, unless there is a change in the development gap or uneven sensitivity of the photosensitive drums 2Y, 2M, 2C, and 2K. In reality, however, the image density is affected by, for example, the change in the development gap or the uneven sensitivity of the photosensitive drums 2Y, 2M, 2C, and 2K, as described above, even if the solid image is formed under constant image formation conditions.

The change in the image density is detected on the basis of the detection, by the toner image detector 30, of the density of the solid band pattern which is long in the sub-scanning direction. It is to be noted that the change in image density of the first, second and fourth image patterns is detected by the toner image detector 30. Specifically, detection signals of the toner image detector 30 are sent to the controller 37 as time-series data, and the toner adhesion amounts are chronologically recognized by the controller 37 and stored as time-series image densities by the function of the image density storage device.

The controller 37 functioning as the image density storage device correlates the image densities with the phase of the photosensitive drums 2Y, 2M, 2C, and 2K on the basis of the signals of the photo interrupters 18Y, 18C, 18M, and 18K, and averages the image densities by the rotational period of the photosensitive drums 2Y, 2M, 2C, and 2K. Thereby, the controller 37 acquires and stores image density correlated with the phase of the photosensitive drums 2Y, 2M, 2C, and 2K, which corresponds to later-described uneven density data f (t).

In principle, if the uneven rotation component of the photosensitive drums is calculated in advance when, for example, the photosensitive drums are installed in or removed from the image forming apparatus 100, the present control method maintains the control effect, unless the state of the photosensitive drums changes such as when the photosensitive drums are detached from and reattached to the image forming apparatus 100 or when the photosensitive drums are replaced with new photosensitive drums, for example. That is, if a control table for eliminating the influence of the uneven sensitivity of the photosensitive drums is generated when, for example, the photosensitive drums are detached from and reattached to the image forming apparatus 100, there is no need to generate the control table on other occasions.

As described above, the elements for forming an image include the charging condition, the exposure condition, the development condition, and the transfer condition. In the present illustrative embodiment as described above, the development condition is determined as the first element, and the development devices 5Y, 5M, 5C, and 5K serve as the first image forming device capable of adjusting the image density by using the first element.

In order to adjust the image density, the controller 37 functions as a third image formation condition determination device to determine the third condition as the third image formation condition which is specific density correction data, i.e., the first density correction data for the development condition. The controller 37 functioning as the third image formation condition determination device determines the third condition based on the uneven density of the image pattern having the length corresponding to at least the circumferential length of the photosensitive drums 2Y, 2M, 2C, and 2K, detected by the toner image detector 30.

The controller 37 functioning as the third image formation condition determination device enables the toner image detector 30 to detect the uneven density of the third image pattern when the rotational position of the photosensitive drums 2Y, 2M, 2C, and 2K is changed. Then, the controller 37 functioning as the third image formation condition determination device extracts among the uneven densities the uneven density of the image caused by the rotational fluctuation component constituting the development gap fluctuation component of the photosensitive drums 2Y, 2M, 2C, and 2K. Furthermore, the controller 37 functioning as the third image formation condition determination device determines the third condition to suppress the uneven density.

The development condition is selected as the first element in consideration of its relatively high sensitivity to the image density adjustment, as compared with other elements. The exposure condition is also relatively highly sensitive to the image density adjustment, and thus may replace the development condition as the first element, or may be selected as a parameter serving as the first element, as well as the development condition. In such a case, the development devices 5Y, 5M, 5C, and 5K and/or the optical writing devices 4Y, 4C, 4M, and 4K may serve as the first image forming device.

In the present illustrative embodiment, as described above, the development condition as the third condition is the development bias. The development condition, however, is not limited to the development bias, and may be any other parameter capable of adjusting the image density. Thus, if the exposure condition is determined as the third element, exposure intensity, i.e., exposure power, may be used as the third condition.

In the image formation, the development devices 5Y, 5M, 5C, and 5K operate in accordance with the thus-determined third condition, and the operation thereof is controlled by the controller 37. The controller 37 serves as the image density controller that controls the development devices 5Y, 5M, 5C, and 5K serving as the first image forming device using the third condition for obtaining the uniform image density. In this regard, the controller 37 functions as a third controller as the first image density controller.

Herein, a change in the rotational position of the photosensitive drums 2Y, 2M, 2C, and 2K is expected in at least one of the following circumstances: initial installation of the photosensitive drums 2Y, 2M, 2C, and 2K into the image forming apparatus, replacement of the photosensitive drums 2Y, 2M, 2C, and 2K with new photosensitive drums, and detachment and attachment of the photosensitive drums from and to the image forming apparatus. The change in the rotational position of the photosensitive drums 2Y, 2M, 2C, and 2K causes a change in the occurrence pattern of uneven density attributed to the change in the development gap. It is therefore necessary to change a profile corresponding to the control table for controlling the image density, i.e., the development condition.

That is, the determination of the image formation condition, in other words, generation and updating of the control table is performed immediately after the photosensitive drum (image bearing member) is installed into the image forming apparatus upon, for example, initial installation, replacement, or detachment and attachment of the photosensitive drum, because it is highly possible that mechanical removal of the photosensitive drums from the image forming apparatus changes occurrence of uneven image density according to the rotational period of the photosensitive drum. This is also because a change occurs in the relative positions of the photosensitive drums 2Y, 2M, 2C, and 2K and the photo interrupters 18Y, 18C, 18M, and 18K provided as a photosensitive-drum home position detector.

When the photosensitive drums 2Y, 2M, 2C, and 2K are initially installed into the image forming apparatus, the control table is not yet generated. It is therefore necessary to first generate the control table for performing a series of correction control. When the photosensitive drum is replaced with a new photosensitive drum, the new photosensitive drum is different from the old photosensitive drum in terms of uneven rotation characteristics and uneven photosensitivity characteristics. It is therefore necessary to create a new control table according to the new photosensitive drum. Furthermore, when the photosensitive drum is simply detached from and reattached to the image forming apparatus for maintenance work, it is necessary to create a control table.

Detachment and attachment of the photosensitive drum may result in a change in the installed state of the photosensitive drum, for example, the relative positions of the shaft and the rotation axis of the photosensitive drum. For the reasons described above, it is necessary to determine the image formation condition, i.e., generate and/or update the control table immediately after the installation of the photosensitive drum into the image forming apparatus.

As described above, the uneven sensitivity of the photosensitive drums 2Y, 2M, 2C, and 2K results in fluctuations of the image density. The uneven sensitivity of the photosensitive drums 2Y, 2M, 2C, and 2K is caused not only by the change in the development gap but also by a change in the environmental condition inside the main body 99 due to a change in the operating environment of the image forming apparatus 100, such as when the number of image forming operations reaches a predetermined number. That is, if the sensitivity of the photosensitive drums 2Y, 2M, 2C, and 2K to exposure varies due to elements such as deterioration with time and environmental changes, the density fluctuates, resulting in uneven density even if the photosensitive drums 2Y, 2M, 2C, and 2K are exposed with a certain exposure. The reason is that the bright portion potential, that is, the potential of the photosensitive drums 2Y, 2M, 2C, and 2K after exposure varies, the electric field changes.

Accordingly, the uneven density due to fluctuations of the uneven sensitivity can be suppressed by updating the third condition at a predetermined timing after the rotational positions of the photosensitive drums 2Y, 2M, 2C, and 2K are changed. The timing at which the third condition is updated includes after a predetermined number of image forming operations is performed, when the environmental condition inside the main body 99 changes due to changes in the operating environment of the image forming apparatus 100, and so forth. Formation of the third image pattern and reading thereof are performed at the appropriate timing described above such as when no user-specified image formation is performed. Further, if an image formed in accordance with specification by a user includes an image with a uniform, relatively high density having a length corresponding to at least the circumferential length of the photosensitive drum, the third condition may be updated by the use of the image. The same applies to a later-described fourth condition.

Next, a description is provided of the fourth condition. In the present illustrative embodiment as described above, the charging devices 3Y, 3C, 3M, and 3K serve as a second image forming device capable of adjusting the image density using the charging condition as the second element.

In order to adjust the image density, the controller 37 functions as a fourth image formation condition determination device to determine the fourth condition as the fourth image formation condition which is specific density correction data for the charging condition, i.e., the second density correction data. The controller 37 functioning as the fourth image formation condition determination device determines the fourth condition based on the uneven density of the fourth image pattern.

As described above, the controller 37 functioning as the fourth image formation condition determination device enables the toner image detector 30 to detect the uneven density of the fourth image pattern when the rotational position of the photosensitive drums 2Y, 2M, 2C, and 2K is changed. Then, the controller 37 functioning as the fourth image formation condition determination device extracts among the uneven densities the uneven density attributed especially to the third condition. Furthermore, the controller 37 functioning as the fourth image formation condition determination device determines the fourth condition to suppress the uneven density.

A description is now provided of the uneven density attributed to the third condition. That is, the change in image density changes the type of the potential difference determining the sensitivity of the photosensitive drums 2Y, 2M, 2C, and 2K affecting the toner adhesion amount, and thereby changes the sensitivity of the photosensitive drums 2Y, 2M, 2C, and 2K. More specifically, in a shadow portion having a relatively high density, such as a solid image portion having a relatively large toner adhesion amount, a development potential (i.e., a potential difference between the development bias and the bright portion potential) is dominant. By contrast, in a halftone or highlighted image portion smaller in the toner adhesion amount than the shallow portion, the background potential (i.e., a potential difference between the development bias and a dark potential of a non-exposed portion of the photosensitive drums 2Y, 2M, 2C, and 2K) is dominant.

As described above, for the image of a relatively high density, in which the development potential is dominant, uneven density is suppressed with the use of the third condition, such as the development bias.

However, when the correction is performed only with the third condition, uneven density occurs in the halftone or the highlighted image portion because the background potential changes due to the third condition, causing the toner adhesion amount in the halftone or the highlighted portion to change.

In the halftone or the highlighted image portion, in which the background potential is dominant, the background potential needs to be controlled with the use of a condition different from the third condition, i.e., the fourth condition. Among the elements for forming an image, the charging condition is effective in controlling the background potential.

Therefore, in the present illustrative embodiment, the charging condition, specifically, the charging bias, is used as the fourth condition. The fourth condition, however, is not limited to the charging bias, and may be any other parameters that are capable of adjusting the image density.

Because the image density area in which the background potential to be controlled by the charging condition is dominant is the halftone or the highlighted image portion, the fourth image pattern to be formed to obtain the fourth condition has a halftone density. In addition, the image density area controlled by the third condition, such as the development condition, is a relatively high density area, and the third image pattern is formed with a high density. The uneven density in the image area smaller in the density than this high density area also needs to be controlled.

In the present illustrative embodiment, the charging condition, specifically, the charging bias is used as the fourth condition. According to the present embodiment, the charging condition is defined as the second element to be controlled by the above-described control method, and the second image forming device capable of adjusting the image density using the second element is constituted of the charging devices 3Y, 3C, 3M, and 3K.

The fourth condition is determined by the controller 37 functioning as the fourth image formation condition determination device to suppress the uneven density of the image with a lower density than that of the density to be corrected by the third condition.

Uneven density of the image having a relatively high density is controlled by the third control as the first image density control using the third condition. Uneven density of the halftone or the highlighted image having a lower density is controlled by the fourth control as the second image density control using the fourth condition. The fourth condition is thus used together with the third condition which changes the development potential.

According to this configuration, the third condition changes the background potential, and thus it is necessary to change the fourth condition. The third condition, which is dominant in an image having a relatively high density, also affects the fourth condition. The third condition and the fourth condition affect each other.

Uneven density is more easily recognized in an image having a relatively high density than in an image having a relatively low density. It is therefore preferable to first determine the third condition, and then determine the fourth condition in consideration of the influence of the third condition to cancel the influence.

As described above, when forming the fourth image pattern, the development condition obtained by forming the third image pattern is changed by applying the third condition while other image formation conditions are kept constant.

Herein, other image formation conditions include elements other than the development condition. For example, the elements include the charging condition of the charging devices 3Y, 3C, 3M, and 3K, the exposure condition (i.e., writing condition) of the optical writing devices 4Y, 4C, 4M, and 4K, the transfer condition of the primary transfer rollers 6Y, 6M, 6C, and 6K, and so forth.

The controller 37 functioning as the fourth image formation condition determination device determines the fourth condition based on the uneven density of the fourth image pattern to adjust the image density lower than the density corrected by the third condition.

The controller 37 functioning as the fourth image formation condition determination device determines the fourth condition based on the uneven density of the third image pattern and the influence of the third condition to the image density to adjust the density of an image lower in density than the third image pattern. Meanwhile, the controller 37 functioning as the fourth image formation condition determination device determines the fourth condition such that the influence of the third condition to the image lower in density than the third image pattern is canceled.

In the image formation, the charging devices 3Y, 3C, 3M, and 3K operate in accordance with the thus-determined forth condition, and the operation thereof is controlled by the controller 37. The controller 37 functions as the image density controller that controls the charging devices 3Y, 3C, 3M, and 3K serving as the second image forming device using the fourth condition for obtaining the uniform image density. In this regard, the controller 37 functions as a fourth controller as the second image density controller.

Therefore, the image formation after determination of the third and the fourth conditions is performed as follows. That is, the controller 37 functioning as the third controller and the fourth controller operates the development devices 5Y, 5M, 5C, and 5K in accordance with the third condition, while operating the charging devices 3Y, 3C, 3M, and 3K in accordance with the fourth condition.

Figure 6:
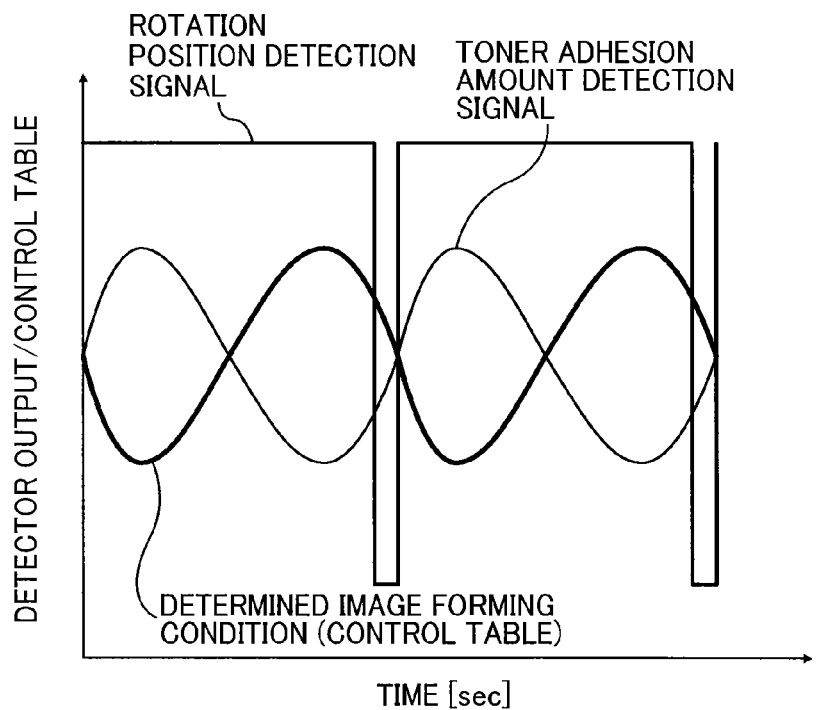
FIG. 6 is a graph illustrating a relation between a rotational position detection signal detected by a rotational position detector, a toner adhesion amount detection signal provided by the image density detector, and an image forming condition generated based on the these signals.

FIG. 6 illustrates an example of the relationship between the rotational position detection signals output from the photo interrupters 18Y, 18C, 18M, and 18K, the toner adhesion amount detection signals output from the toner image detector 30, and the control table corresponding to the image formation condition generated on the basis of these signals. Each of the signals illustrated in FIG. 6 corresponds to twice the circumferential length of the photosensitive drums 2Y, 2M, 2C, and 2K.

In FIG. 6, a condition indicated as a determined image formation condition is the third condition and the fourth condition superimposed on each other. Strictly speaking, the determined image formation condition is in a state in which the timing correction data for the development bias and the charging bias is applied to the superimposed condition with the third condition and the fourth condition superimposed. This condition is referred to as a timing optimization condition, and data indicating the condition is referred to as timing optimization data.

In FIG. 6, uneven density of the image pattern is indicated as the toner adhesion amount detection signal. Strictly speaking, the image pattern herein does not necessarily correspond to the third image pattern and the fourth image pattern.

As illustrated in FIG. 6, the toner adhesion amount detection signal changes on the same cycle as that of the rotational position detection signal. Accordingly, the following operations are performed in synchronization with the rotational position of the photosensitive drums 2Y, 2M, 2C, and 2K detected by the photo interrupters 18Y, 18C, 18M, and 18K. The operations include: calculation and determination of the third condition by the controller 37 functioning as the third image formation condition determination device; calculation and determination of the fourth condition by the controller 37 functioning as the fourth image formation condition determination device; operation of the development devices 5Y, 5M, 5C, and 5K, and/or the optical writing devices 4Y, 4C, 4M, and 4K according to the third condition; and operation of the charging devices 3Y, 3C, 3M, and 3K according to the fourth condition.

As understood from FIG. 6, the image formation condition in which the third condition and the fourth condition are superimposed is generated as time-series data having a waveform canceling (in other words, offsetting) the uneven density. Therefore, the control table corresponding to the image formation condition is determined to have an opposite phase to that of the toner adhesion amount detection signal.

Herein, if the development bias or the exposure power serving as an image density control parameter used as the third condition and the charging bias serving as an image density control parameter used as the fourth condition are assigned with the minus sign or increased in absolute value, the toner adhesion amount may be reduced. The expression "opposite phase" is used herein in the sense of generating a control table that cancels the change in the toner adhesion amount indicated by the toner adhesion amount detection signal, that is, generating a control table that creates a change in toner adhesion amount having the opposite phase.

Later-described adjustment gains for determining the control table, that is, determining the amount of change in voltage (V) of the control table to be set relative to the amount of change in voltage (V) of the toner adhesion amount detection signal, are, in principle, derived from theoretical values. In reality, however, it is highly possible that gains based on the theoretical values are tested with actual devices and ultimately determined on the basis of experimental data.

The thus-determined gains determine the control table (for example, a later-described condition VB(t)). The control table and the rotational position detection signal have the timing relationship illustrated in FIG. 6, for example. In the example illustrated in FIG. 6, the beginning of the control table corresponds to the time of generation of the rotational position detection signal.

The operations to be carried out in synchronization with the rotational position of the photosensitive drums 2Y, 2M, 2C, and 2K detected by the photo interrupters 18Y, 18C, 18M, and 18K are not limited to the above described operations, but include formation of the first through fourth image patterns.

In the example shown in FIG. 6, the image patterns are formed such that the leading end position of the image pattern in the sub-scanning direction is in synchronization with the rise timing of the rotational position detection signal.

In order to form the image pattern in this timing, as illustrated in FIG. 7, the photosensitive drum rotational position detection signal is provided to the controller 37. The photosensitive drum rotational position detection signal comprises detection signals associated with the rotational position of the photosensitive drums 2Y, 2M, 2C, and 2K detected by the photo interrupters 18Y, 18C, 18M, and 18K. This detection signal is sent to the pattern forming device via the controller 37, and the pattern forming device forms the image pattern based on the input detection signal.

Figure 8:
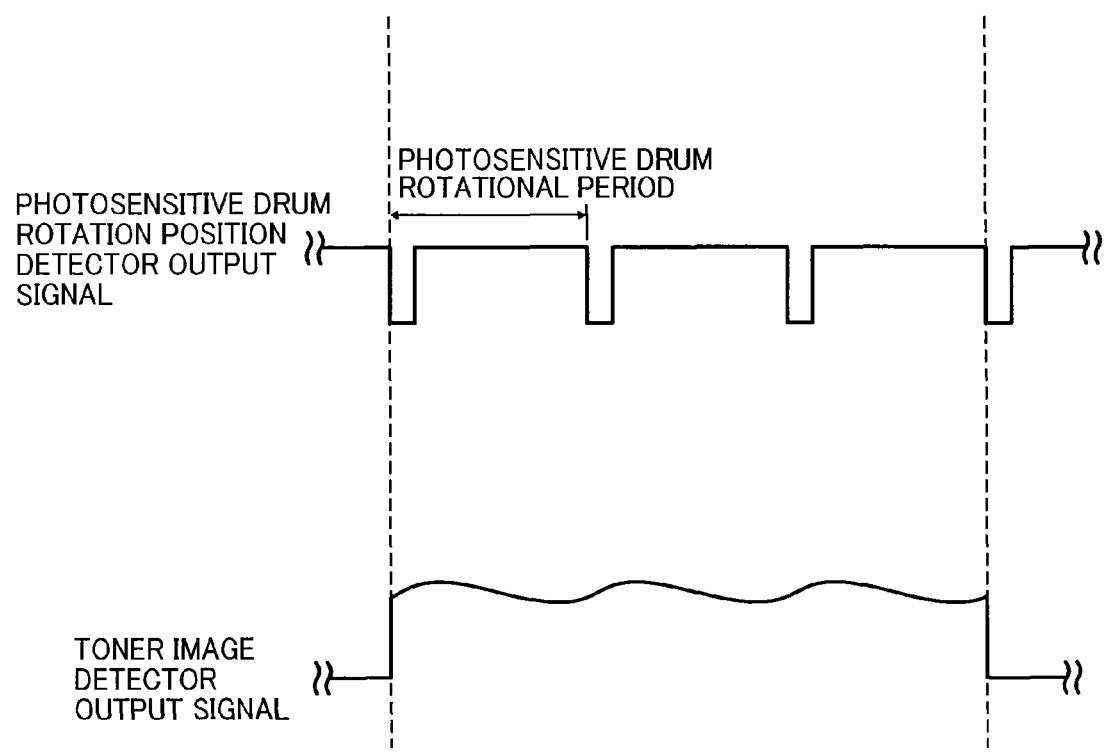
FIG. 8 is a timing chart illustrating a relation between the signals of the image density detector and the rotational position detector.

As illustrated in FIG. 7, the detection signal associated with the density of the image pattern detected by the toner image detector 30 is provided to the controller 37. With the input of these detection signals, the relation between the uneven density information detected by the toner image detector 30 and the rotational position of the photosensitive drums 2Y, 2M, 2C, and 2K detected by the photo interrupters 18Y, 18C, 18M, and 18K is obtained as illustrated in FIG. 8, for example.

At a central processing unit (CPU) of the controller 37, calculation of the image pattern obtained by the toner image detector 30, more specifically, the above-described averaging processing and the like is performed based on the signals of the photo interrupters 18Y, 18C, 18M, and 18K.

In the present illustrative embodiment, with this averaging processing, the third condition and the fourth condition correspond to the density correction data corresponding to the rotational period of the rotators, i.e., the photosensitive drums 2Y, 2M, 2C, and 2K. The third condition and the fourth condition are stored in the controller 37 and constitute the control table. Other matters associated with the calculation of the third condition and the fourth condition will be described later. As will be described later, the averaging processing may be performed according to the rotational period of the development rollers 5Ya, 5Ca, 5Ma, and 5Ka as a rotator. Thus, for convenience sake, FIG. 7 also shows the rotational position detection signal of the development roller.

As long as the third condition and the fourth condition include the density correction data for the elements that can adjust the image density to obtain uniform image density, the third condition and the fourth condition are not limited to the thus-obtained data or data obtained by using a later-described function. For example, the third condition and the fourth condition may be stored as a control table in the nonvolatile memory or the like of the controller 37 in advance upon shipment of the image forming apparatus 100. Alternatively, the third condition and the fourth condition may be obtained through a known process control. The third condition and the fourth condition may be in the form other than a function.

If the control table shown in FIG. 6 is a development bias control table, the time of application of the control table needs to be determined in consideration of the distance between the development nip and the toner image detector 30, that is, the travel distance of the toner image from the development nip to the toner image detector 30. If the distance is equal to an integral multiple of the circumferential length of the photosensitive drum, the control table may be applied from the beginning in synchronization with the rotational position detection signal. If the distance is different from an integral multiple of the circumferential length of the photosensitive drum, the control table may be applied at a time shifted by a time corresponding to the difference in the distance. This is to prevent shifting of the phase of the waveform of the uneven density extracted based on the rotational position of the photosensitive drums 2Y, 2M, 2C, and 2K detected by the photo interrupters 18Y, 18C, 18M, and 18K.

Similarly, if the control table is an exposure power control table, the control table is applied in consideration of the distance between the exposure position and the toner image detector 30. Further, if the control table is a charging bias control table, the control table is applied in consideration of the distance between the charging position and the toner image detector 30.

However, in reality, even when the control table is applied in consideration of the difference in the layout distance, there is a shift of approximately ten and several milliseconds (ms) between the uneven density and an effective position of the control table to correct the uneven density, thereby reducing the control effect for the uneven density. A delay in the response from a high-voltage power pack serving as a power source to apply the development bias and the charging bias and layout errors due to parts variations or the like result in the degradation of control effect even when the third condition and the fourth condition are applied as they are.

Furthermore, an amount of shift per millisecond is greater in a high frequency. Thus, it is difficult to reduce the uneven density at the high frequency, which is easily noticeable. To address this difficulty, in one approach, the phase of the control table may be adjusted while observing the image. With this configuration, adjustment is necessary for every color in every machine, which results in reduced productivity and an increase in downtime.

Implementing high-precision parts may reduce errors in the layout distance. However, reducing the variations in the layout distance only with high-precision parts costs more and is thus unrealistic.

In view of the above, in the image forming apparatus 100, a phase shift attributed to the delay in the output of the power source and parts variations, other than the theoretical layout distance, is measured in the following operation mode, and the measured value thus obtained is employed in the control table. With this configuration, uneven density is corrected effectively.

In the operation mode, the first image pattern and the second image pattern for detection of the phase shift are formed, and the timing correction data for properly applying the third condition and the fourth condition, i.e., the density correction data to eliminate the uneven density of the image is obtained. In other words, this operation mode is referred to as a timing obtaining mode. The timing correction data, i.e., the first timing correction data, for the third condition which is the density correction data for the development bias is defined as the first condition as the first image formation condition to prevent the phase shift in the third condition. The timing correction data, i.e., the second timing correction data, for the fourth condition which is the density correction data for the charging bias is defined as the second condition as the second image formation condition to prevent the phase shift in the fourth condition.

When obtaining the first condition, the first image pattern is formed while changing the development bias. More specifically, the first image pattern is formed while changing the development bias at a frequency of rotator, that is, on the rotational period of the photosensitive drums 2Y, 2M, 2C, and 2K. The first image pattern is formed to measure the delay, in other words, a phase shift, from the operating point of the development bias control as the first element until the toner image detector 30. In other words, the first image pattern is formed to measure the phase shift. In order to measure a mere phase shift, the first image pattern is a halftone image pattern so that the density of the first image pattern corresponds to the density of the halftone or highlighted portion which is less influenced by the change in the gap as described later.

When obtaining the second condition, the second image pattern is formed while changing the charging bias. More specifically, the second image pattern is formed while changing the charging bias at a frequency of rotator, that is, on the rotational period of the photosensitive drums 2Y, 2M, 2C, and 2K. The second image pattern is formed to measure the delay, in other words, a phase shift, from the operating point of the control of the charging bias as the second element until the toner image detector 30. In order to measure a mere phase shift, the second image pattern is a halftone image pattern so that the density of the second image pattern corresponds to the density of the halftone or highlighted portion which is less influenced by the change in the gap as described later.

Subsequently, each of the first image pattern and the second image pattern are measured by the toner image detector 30, thereby obtaining the first condition and the second condition. More specifically, based on the rotational position of the photosensitive drums 2Y, 2M, 2C, and 2K detected by the photo interrupters 18Y, 18C, 18M, and 18K, waveforms and measured results are input by the toner image detector 30, and based on the waveforms and the measured results, the phase shift attributed to the delay in the output of the high-voltage power pack and parts variations, other than the theoretical layout distance, is calculated. This calculation of the shift includes a frequency analysis such as FFT.

Figure 9:
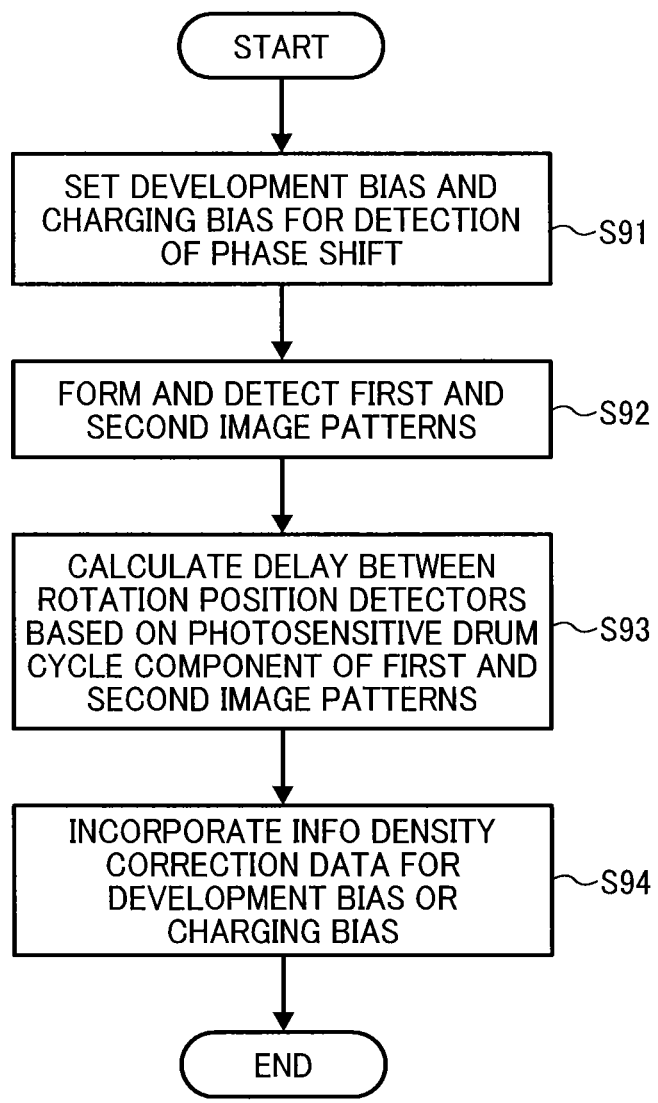
FIG. 9 is a flowchart showing steps in a process of obtaining and incorporating timing correction data according to an illustrative embodiment of the present disclosure.

With reference to FIG. 9, a description is provided of measurement of phase lag. FIG. 9 is a flowchart showing steps in a process of measuring the phase lag from the development rollers 5Ya, 5Ca, 5Ma, and 5Ka, and charging devices 3Y, 3C, 3M, and 3K to the toner image detector 30 when controlling the charging bias.

First, at step S91, one of the development bias and the charging bias is set as the image formation condition to detect the phase shift (S91). At this time, the amount of change in each bias, more specifically, the degree of amplitude, is greater than the amount of change of the development bias in the third condition and the amount of change of the charging bias in the fourth condition.

Subsequently, when the development bias is set, the first image pattern is formed, and when the charging bias is set, the second image pattern is formed. Then, at step S92, uneven density of the image pattern is detected in accordance with the periodic component, i.e., the rotational period of the photosensitive drums 2Y, 2M, 2C, and 2K.

At step S93, based on the uneven density on the rotational period, the uneven density due to the rotation variation of the photosensitive drums 2Y, 2M, 2C, and 2K is calculated. Based on the calculated uneven density, a time delay in the development bias or the charging bias is calculated. This time delay corresponds to the phase shift described above. The development bias corresponds to the first condition, and the charging bias corresponds to the second condition.

The controller 37 calculates and obtains the first condition and the second condition. The controller 37 obtains the first condition for correction of driving timing of the development devices 5Y, 5M, 5C, and 5K based on the change in the density of the first image pattern which is formed while changing the development bias as the first element and detected by the toner image detector 30. In this regard, the controller 37 functions as a first timing correction data obtainer and also as a first image formation condition determination device. The controller 37 obtains the second condition for correction of driving timing of the charging devices 3Y, 3C, 3M, and 3K based on the change in the density of the second image pattern which is formed while changing the charging bias as the second element and detected by the toner image detector 30. In this regard, the controller 37 functions as a second timing correction data obtainer and also as a second image formation condition determination device.

At step S94, the controller 37 preforms the first control in which the first condition is reflected in the third condition, and also performs the second control in which the second condition is reflected in the fourth condition. In this regard, the controller 37 functions as a first controller to perform the first control and also functions as a second controller to perform the second control.

Thus, when the controller 37 functioning as the third controller controls the development devices 5Y, 5M, 5C, and 5K using the third condition, the third condition is in a state in which the first condition is applied by the controller 37 functioning as the first controller. In accordance with a first timing optimization condition as the timing optimization condition, the development devices 5Y, 5M, 5C, and 5K are driven by a first timing optimization data as the timing optimization data. When the controller 37 functioning as the fourth controller controls the charging devices 3Y, 3C, 3M, and 3K using the fourth condition, the fourth condition is in a state in which the second condition is applied by the controller 37 functioning as the second controller. In accordance with a second timing optimization condition as the timing optimization condition, the charging devices 3Y, 3C, 3M, and 3K are driven by the second timing optimization data as the timing optimization data.

In a state in which the first condition and the second condition are applied to the third condition and the fourth condition, the first timing optimization condition and the second timing optimization condition, and the first timing optimization data and the second timing optimization data are obtained in a manner described below.

When the first condition and the second condition are not reflected in the control table storing the third condition and the fourth condition, the first condition and the second condition are reflected based on the later-described timing and the development bias and charging bias are applied according to the third condition and the fourth condition. With this configuration, the first timing optimization condition and the second timing optimization condition and the first timing optimization data and the second timing optimization data are obtained, and image forming operation is performed based on the data thus obtained. The timing herein refers to a time at which the predetermined rotational position of the photosensitive drums 2Y, 2M, 2C, and 2K is detected by the photo interrupters 18Y, 18C, 18M, and 18K.

Alternatively, the control table may store the third condition and the fourth condition while the first condition and the second condition are reflected in the control table. In this case, the first timing optimization condition and the second timing optimization condition and the first timing optimization data and the second timing optimization data thus obtained are stored in the control table. In this configuration, the development bias and the charging bias are applied according to the first timing optimization condition, the second timing optimization condition, the first timing optimization data, and the second timing optimization data using the control table, and the image forming operation is performed.

Still referring to FIG. 9, a more detailed description of the control is provided below. When the first image pattern is formed to detect the phase shift, that is, to measure the amount of phase shift at step S91, the development bias is modulated using an equation 1. When forming the second image pattern, the charging bias is modulated also using the equation 1.

$$OUT(t)=OFFSET+Amp*\{\sin\{\omega(t+tl)\}+\sin\{2*\omega(t+tl)\}+\ldots+\sin\{n*\omega(t+tl)\}\},$$ [Equation 1]

where OUT (t) is an input signal of the charging bias or the development bias, OFFSET is a fixed value as a base value, Amp is an amplitude, ω is an angular velocity of the photosensitive drum, n is a control order, and tl is a phase shift time for the layout from the development bias and charging bias operating point.

OFFSET refers to the image formation condition determined by the different control so as to obtain a predetermined image density. In the present illustrative embodiment, the development bias is approximately −500 V, the charging bias is approximately −650 V, and the exposure power is 70%.

Amp represents an amplitude of sinusoidal waveform, the size of which is large enough so as not to generate an adverse effect on the image pattern, for example, background contamination and undesirable carrier adherence, and not to be influenced by uneven density. Therefore, the value of Amp is equal to or greater than ±30 V and equal to or less than ±100, preferably, ±50 V.

The angular velocity ω is a speed of each of the photosensitive drums 2Y, 2M, 2C, and 2K as a rotator to be controlled. As will be later described, when the rotator to be controlled is the development rollers 5Ya, 5Ca, 5Ma, and 5Ka, the angular velocity U) is the speed of the development rollers 5Ya, 5Ca, 5Ma, and 5Ka.

The control order is a primary sinusoidal waveform. Therefore, the equation 1 is up to the second member.

tl is a value representing time. Thus, it may be expressed as tl [t].

Upon formation of the first image pattern, the design layout distance from the development nip assumed as the operating point of the development bias as the first element to the toner image detector 30 is divided by the linear velocity of the photosensitive drums 2Y, 2M, 2C, and 2K, and the remainder thus obtained represents tl. Specifically, the development nip is a position at which the photosensitive drums 2Y, 2M, 2C, and 2K and the development rollers 5Ya, 5Ca, 5Ma, and 5Ka are in closest proximity to each other.

Upon formation of the second image pattern, the design layout distance from the position of the operating point of the charging bias as the second element to the toner image detector 30 is divided by a linear velocity of the photosensitive drums 2Y, 2M, 2C, and 2K, and the remainder thus obtained represents tl. This position corresponds to the operating point of the control of the charging bias, which is a center position of an area in which the charging devices 3Y, 3C, 3M, and 3K face the photosensitive drums 2Y, 2M, 2C, and 2K in the direction of A1.

At step S92, the development bias and the charging bias are input in synchronization with rotation of the photosensitive drums 2Y, 2M, 2C, and 2K detected by the photo interrupters 18Y, 18C, 18M, and 18K.

Upon formation of the first image pattern, a phase shift in the design layout distance from the development nip assumed as the operating point of the development bias to the toner image detector 30 is measured. Upon formation of the second image pattern, a phase shift in the design layout distance from the position of the operating point of the charging bias to the toner image detector 30 is measured. As will be described below, these phase shifts are measured by referring the rotational position of the photosensitive drums 2Y, 2M, 2C, and 2K detected by the photo interrupters 18Y, 18C, 18M, and 18K as a reference.

Figure 10:
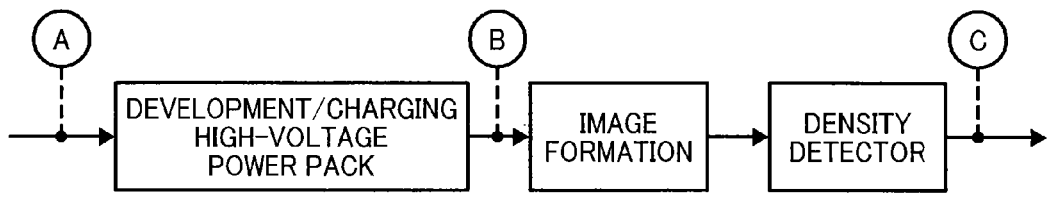
FIG. 10 is a timing chart showing image formation using simply density correction data.
Figure 10:
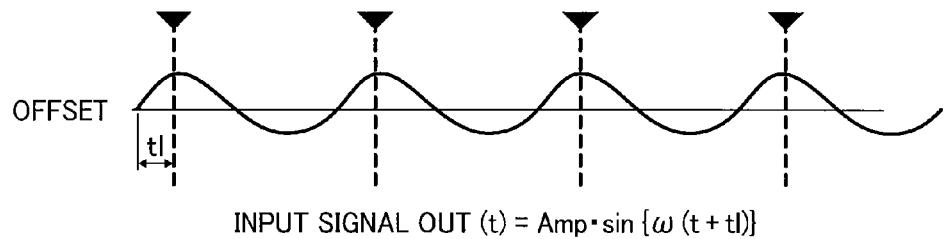
Figure 10:
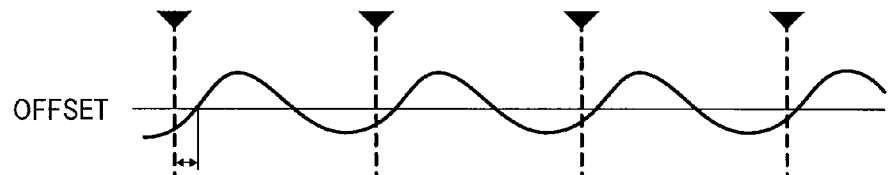

FIG. 10 illustrates a relation between an input signal by the equation 1, the toner image detector 30, and output signals of the photo interrupters 18Y, 18C, 18M, and 18K as the photosensitive drum home position detector.

As illustrated in FIG. 10, the input signal obtained by the equation 1 as an input command signal is provided at a position A. As long as there is no software-related error, there should be no delay. Therefore, based on the output reference of the photo interrupters 18Y, 18C, 18M, and 18K as the rotational position detector, a waveform in which the phase is progressed by tl [t] is output.

At a position B, each bias output from the high voltage power packs is observed. Waveforms of each bias are not illustrated in FIG. 10. However, there is a shift, more specifically, a delay in the output of each bias due to response characteristics of the high voltage power packs.

At a position C, after the image patterns are formed, an adhesion amount waveform detected by the toner image detector 30 is compared with the output reference of the photo interrupters 18Y, 18C, 18M, and 18K. Accordingly, a waveform delayed by td is measured. td represents an amount of the phase lag, that is, a phase shift from application of the bias and the toner image detector 30 and corresponds to a value of the timing correction data which serves as the first condition for the development bias and the second condition for the charging bias.

Figure 11A:
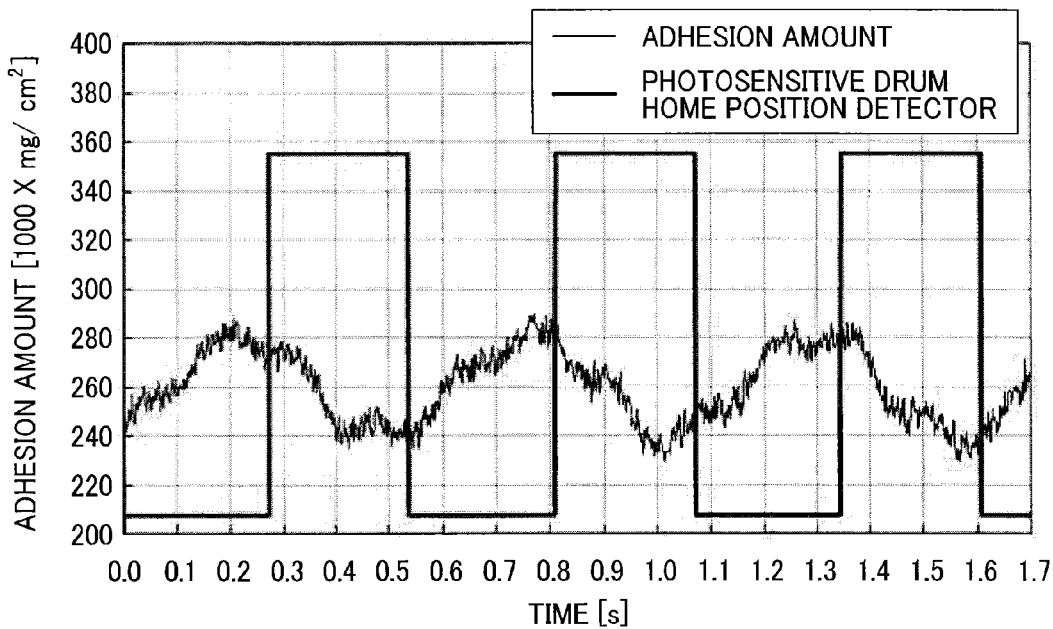
FIGS. 11A and 11B are graphs showing waveforms of toner adhesion amount detection signals detected by the image density detector compared with output of the rotational position detector.
Figure 11B:
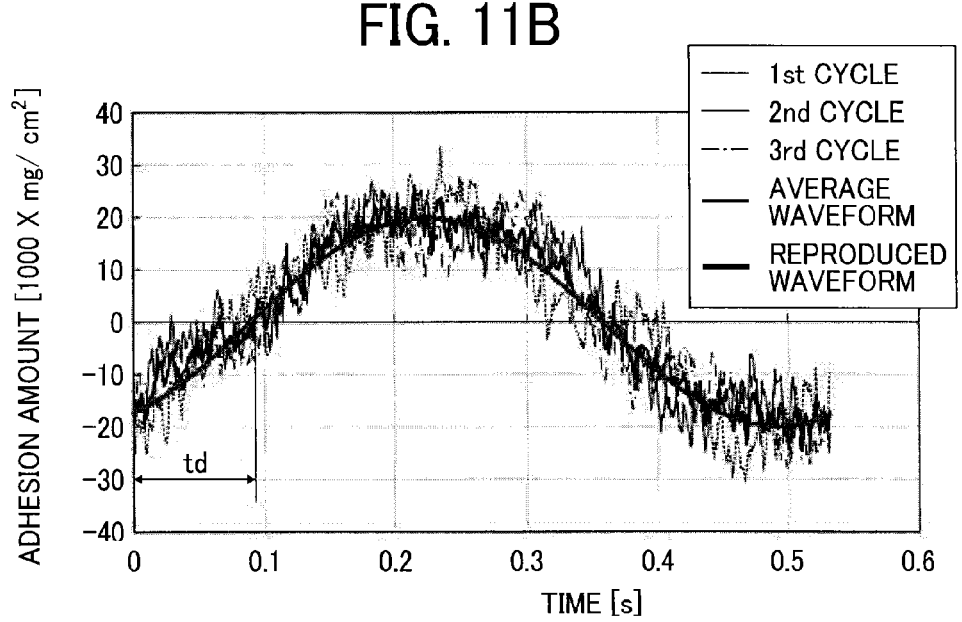

FIGS. 11A and 11B illustrate actual waveforms in which the adhesion amount waveforms detected by the toner image detector 30 are compared with the output reference of the photo interrupters 18Y, 18C, 18M, and 18K.

FIG. 11A illustrates output waveforms of the first image pattern and the second image pattern measured by the toner image detector 30 in synchronization with the rotational position of the photosensitive drums 2Y, 2M, 2C, and 2K detected by the photo interrupters 18Y, 18C, 18M, and 18K. As understood from FIG. 11A, a periodic waveform substantially similar to the sinusoidal waveform is observed at the toner image detector 30.

FIG. 11B illustrates extraction of the adhesion amount data based on the rotational position information of the photo interrupters 18Y, 18C, 18M, and 18K which is obtained in synchronization with the observation of the adhesion amount obtained by the toner image detector 30 shown in FIG. 11A. The extraction is performed by the controller 37 on the rotational period of the photosensitive drums 2Y, 2M, 2C, and 2K.

In the extraction process, an average of the adhesion amount is obtained at the same rotational position for each cycle in order to eliminate components of other frequencies. A difference in the phase shift between the input sinusoidal waveform and the output sinusoidal waveform is calculated relative to an approximate waveform after an analysis of an average periodic waveform and the frequency. This difference corresponds to td described above and is stored as a time delay of the development bias and the charging bias in the controller 37. It is to be noted that if there is no delay in the response of the high voltage power pack or there is no error in the layout distance, td is zero (td=0).

According to the present illustrative embodiment, in order to measure the phase shift other than the shift attributed to the theoretical layout distance, an equation 3 is used and the image formation conditions for the first image pattern and the second image pattern, more specifically, the development bias and the charging bias are provided. However, as long as the phase shift is measured, the following image formation conditions a) through c) may be provided.

a) Where tl=0, the input signal of the development bias and the charging bias is set without consideration of the phase shift for the layout. In this case, only the calculated delay is reflected in the control table without the delay for the layout.

b) Only the specified periodic component is applied, and at least one of the frequency components of the second member or beyond the second member in the equation 1 is provided.

c) The input signal is not limited to the sinusoidal waveform, but may be in such a shape as to obtain a desired phase shift.

Figure 12:
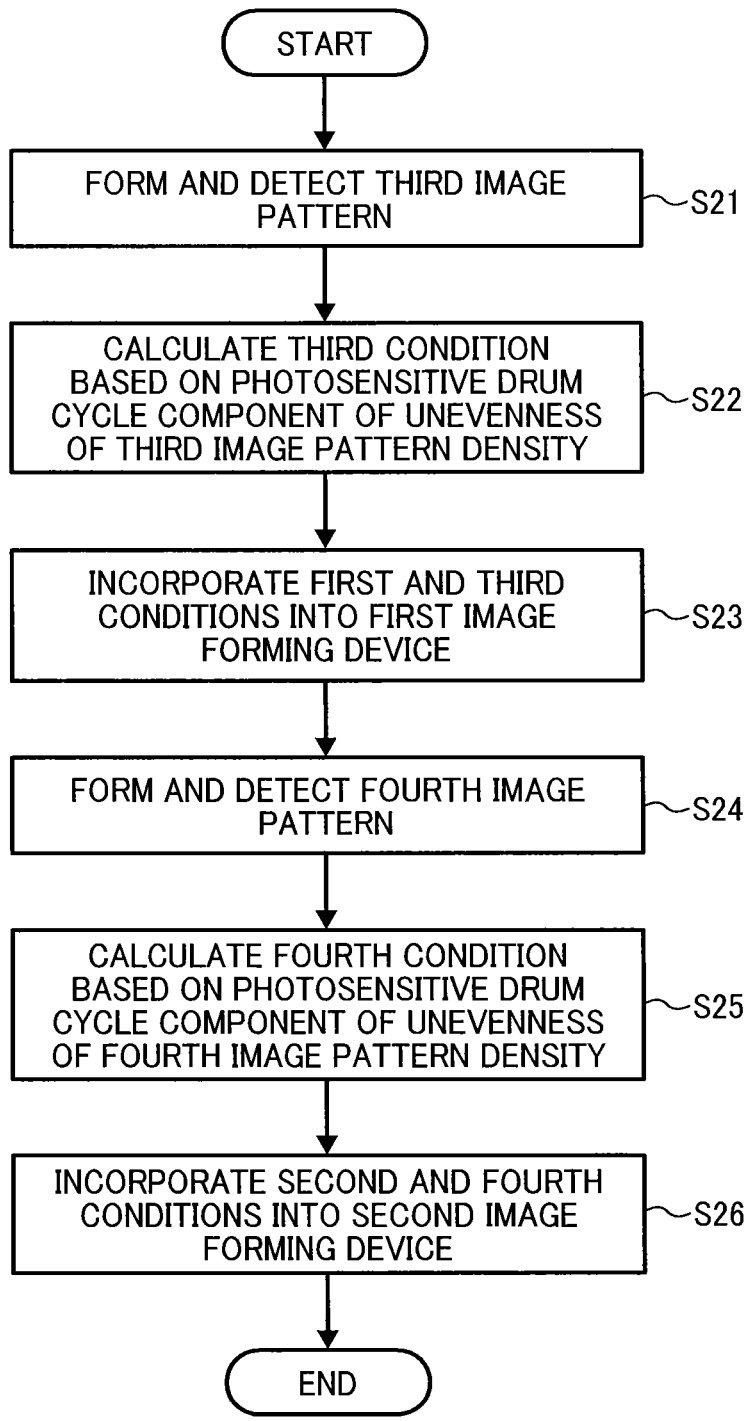
FIG. 12 is a flowchart showing steps in a process of applying the timing correction data to the density correction data.

With reference to FIG. 12, a description is provided of calculation and determination of the third condition and the fourth condition, and application of the first condition and the second condition to the determined third and fourth conditions.

Figure 13A:
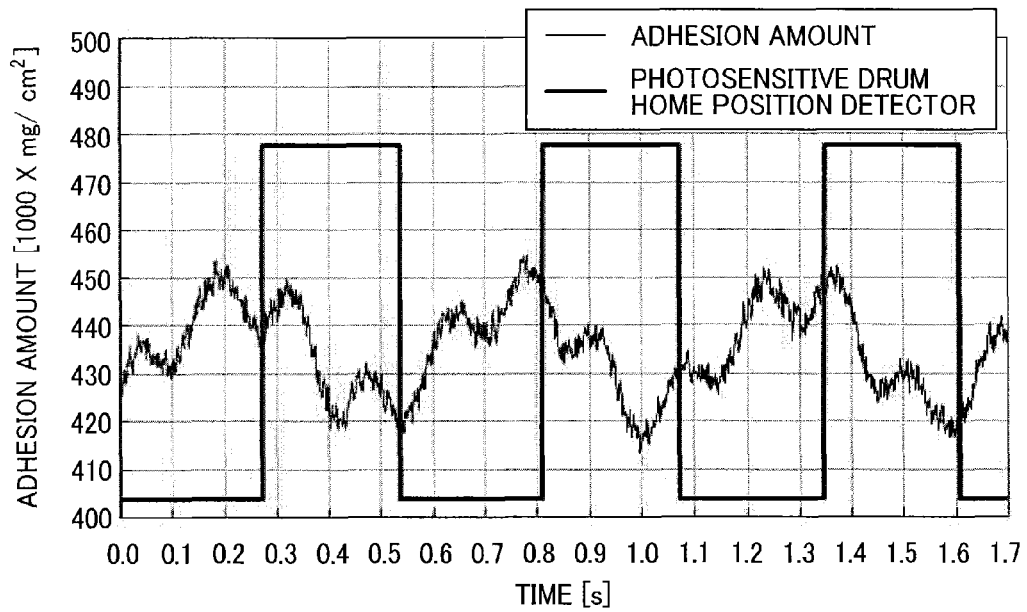
FIGS. 13A and 13B are graphs showing waveforms of toner adhesion amount detection signals detected by the image density detector.

First, at step S21, the third image pattern is formed as illustrated in FIG. 5 and measured by the toner image detector 30, and in the meantime, the detection signals of the photo interrupters 18Y, 18C, 18M, and 18K are synchronized and received. The time-series data of the adhesion amount is obtained as illustrated in FIG. 13A. At this time, as described above, all the image formation conditions such as the development bias, the charging bias, the exposure power, and the primary transfer voltage are constant when forming the third image pattern.

Figure 13B:
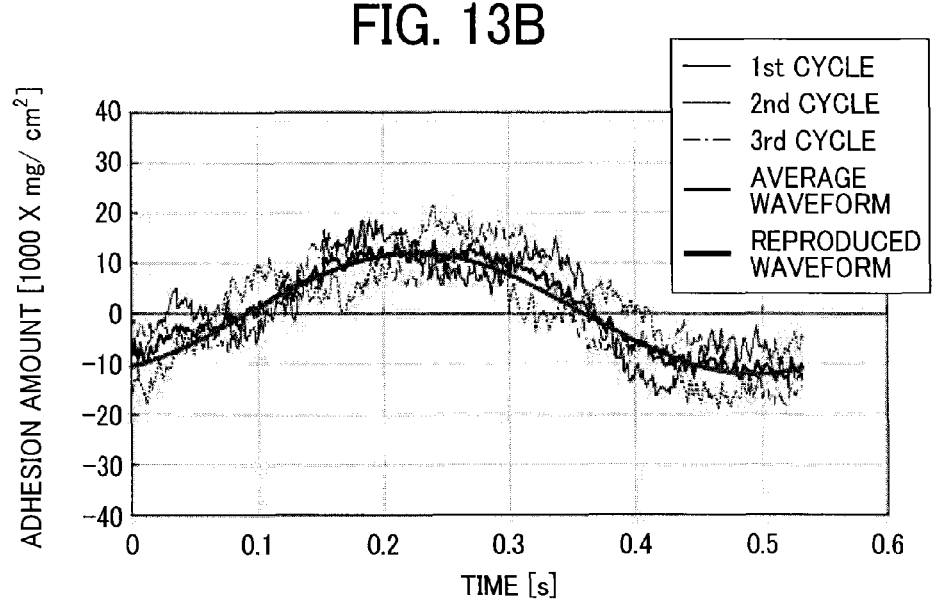

Next, at step S22, the third condition is calculated based on the photosensitive-drum periodic uneven density data of the third image pattern shown in FIG. 13B subjected to a similar or the same process as the period extraction of the first image pattern and the second image pattern. When calculating the third condition, the frequency analysis is performed on the uneven density component in the rotational period of the photosensitive drums 2Y, 2M, 2C, and 2K, and the uneven density is expressed in superimposition of the integral multiples of the rotational frequency of the photosensitive drums 2Y, 2M, 2C, and 2K according to an equation 2.

$$f(t)=\text{OFFSET}+A1*\sin(\omega t+\theta 1)+A2*\sin(2*\omega t+\theta 2)+\ldots+An*\sin(n*\omega t+\theta 3), \quad \text{[Equation 2]}$$

where f (t) is an average of photosensitive drum periodic uneven density, OFFSET is an average adhesion amount, An is an amplitude, $\omega$ is an angular velocity of the photosensitive drum, and $\theta$ is a phase.

As expressed in the equation 2, a profile of the average of photosensitive-drum periodic uneven density is expressed in superimposition with the sinusoidal waveform. Accordingly, errors due to other noises are reduced, and the information includes only the amplitude and the phase, thereby facilitating management of the control. Here, the control order is also a primary sinusoidal waveform. Thus, the equation 2 is up to the second member.

Subsequently, at step S23, in order to correct the uneven density expressed in the form of equation 2, a drive signal VB(t) of the development bias reflected to the first and third conditions is obtained by an equation 3 in consideration of the time delay for the layout and the amount of the phase lag. The drive signal VB(t) of the development bias corresponds to the first timing optimization condition and the first timing optimization data.

$$VB(t)=\alpha*f(t+tl-td), \quad \text{[Equation 3]}$$

where VB(t) is the development bias (V), tl is the design layout distance (s), td is the amount (s) of the phase lag, and $\alpha$ is an adjustment gain 1.

Herein, td is the amount of the phase lag calculated at step S93 in FIG. 9, that is, the time delay of the phase and corresponds to the first condition. In consideration of the phase lag, the third condition is corrected, the first timing optimization condition and the first timing optimization data are generated, and the development bias is applied. Accordingly, the correction accuracy for the uneven density is enhanced.

A remainder of an integral multiple of the design layout distance from the development nip to the toner image detector 30 is divided by a linear velocity of the photosensitive drums 2Y, 2M, 2C, and 2K. The value thus obtained is tl. As described above, in order to control the development bias as the first element, the layout distance is defined as a distance from the development nip to the toner image detector 30. The development nip is a position at which the photosensitive drums 2Y, 2M, 2C, and 2K and the development rollers 5Ya, 5Ca, 5Ma, and 5Ka are in closest proximity to each other.

Correcting the uneven density by outputting the development bias in such a manner can reliably correct the uneven density even when the layout distance is not an integral multiple of the rotational period of the photosensitive drums 2Y, 2M, 2C, and 2K and/or there is a phase lag. The control table, which is generated based on the detection signals of the photo interrupters 18Y, 18C, 18M, and 18K, is applied as the detection signals of the photo interrupters 18Y, 18C, 18M, and 18K as a reference.

Here, the adjustment gain 1:$\alpha$ may be changed in accordance with a change in the state of the development agent due to environmental changes. In a case in which the third condition is set as a table which is not a function such as presented by the equation 2, the start position of the table is changed in accordance with tl and td.

Basically, the fourth condition is determined by the same process as the process employed in the determination of the third condition. That is, the fourth pattern is formed and detected at step S24, and the fourth condition is determined using the result thus obtained at step S25. At step s26, the extraction and processing methods of the fourth image pattern are similar to or the same as the equation 2. The drive signal of the charging bias in which the second condition is reflected to the fourth condition is provided as presented in the equation 3 described above although each adjustment gain is different. The drive signal of the charging bias corresponds to the second timing optimization condition and the second timing optimization data.

The difference between the determination of the fourth condition and the determination of the third condition is described below.

1. Determination of the charging bias;
2. Different image patterns to be used;
3. Inconstancy due to determination of the development bias at step S23;
4. tl employing the design distance from the position assumed to be the operating point of the charging bias to the toner image detector 30;
5. td obtained from the second image pattern; and
6. $\alpha$ being an adjustment gain 2, which is different from the adjustment gain 1

The adjustment gains for the drive signals of the development bias according to the first timing optimization condition in which the first condition is reflected in the third condition, and the first timing optimization data, are tuned in accordance with the actual waveform. Similarly, the adjustment gains for the drive signals of the development bias according to the second timing optimization condition, in which the second condition is reflected to the fourth condition, and the second timing optimization data, are tuned in accordance with the actual waveform.

In a case in which the adjustment gains are influenced by the operating environment of the image forming apparatus 100, such as temperature and humidity, for example, the adjustment gains are prepared such that tables are constituted corresponding to the operating environment and stored in a nonvolatile memory or a volatile memory. Depending on the operating environment of the image forming apparatus 100, the tables may be read out.

The above-described processing shown in FIG. 12 may be repeated multiple times. That is, the development devices 5Y, 5M, 5C, and 5K and the charging devices 3Y, 3C, 3M, and 3K are operated using the first through fourth conditions, and the first through fourth image patterns are formed and detected by the toner image detector 30. The first through fourth conditions are determined once again, and in accordance with the first through fourth conditions the image forming operation specified by users is performed.

In implementing the present control into an actual machine, the gains upon generation of the control tables may be set to relatively low values to prevent over-correction. Therefore, a single execution of the correction control may result in insufficient removal of uneven image density. In this case, the series of correction control may be repeated to further reduce uneven density. The processes of the correction control may be repeated once or multiple times. Repeated formation of the image pattern, however, is disadvantageous in terms of control time and toner yield. It is therefore preferable that the gains be set to values that provide the control effect with single execution of the correction control, and that the correction control is completed without reiteration.

As described above, the third condition and the fourth condition are calculated, and the control table for correction of the photosensitive drum periodic uneven density is generated. The amount of correction of uneven density corresponding to image densities of the photosensitive drums 2Y, 2M, 2C, and 2K is different between the third condition and the fourth condition.

Application of the first condition and the second condition in the third condition and the fourth condition, respectively, in consideration of the amount of the phase shift attributed to the actual delay in the output of the high-voltage power pack and parts variations, other than the phase shift in the theoretical layout distance, is advantageous in that an amount of phase shift associated with each device can be taken into consideration and hence correction accuracy is enhanced.

In the present illustrative embodiment described above, among rotators constituting the development gap including the development rollers 5Ya, 5Ca, 5Ma, and 5Ka, and the photosensitive drums 2Y, 2M, 2C, and 2K, uneven rotation, i.e., the rotational fluctuation component of the photosensitive drums 2Y, 2M, 2C, and 2K is considered. In other words, in the present illustrative embodiment, it is assumed that the development gap is changed by uneven rotation of the photosensitive drums 2Y, 2M, 2C, and 2K. However, the development gap is also changed by uneven rotation, i.e., the rotational fluctuation component of the development rollers 5Ya, 5Ca, 5Ma, and 5Ka.

As rotators that form image patterns, the density of which is detected by the toner image detector 30, the image forming apparatus 100 includes a plurality of rotators, more specifically, two rotators having different rotational periods. These two rotators refer to the photosensitive-drums 2Y, 2M, 2C, and 2K and the development rollers 5Ya, 5Ca, 5Ma, and 5Ka. Thus, the rotators to form the image patters, the density of which is detected by the toner image detector 30, may be the development rollers 5Ya, 5Ca, 5Ma, and 5Ka instead of or together with the photosensitive drums 2Y, 2M, 2C, and 2K. The rotational position detector such as the photo interrupters 18Y, 18C, 18M, and 18K may detect the rotational position of the development rollers 5Ya, 5Ca, 5Ma, and 5Ka, and based on the detected rotational position the uneven density is obtained and the first through fourth conditions are determined.

Figure 14:
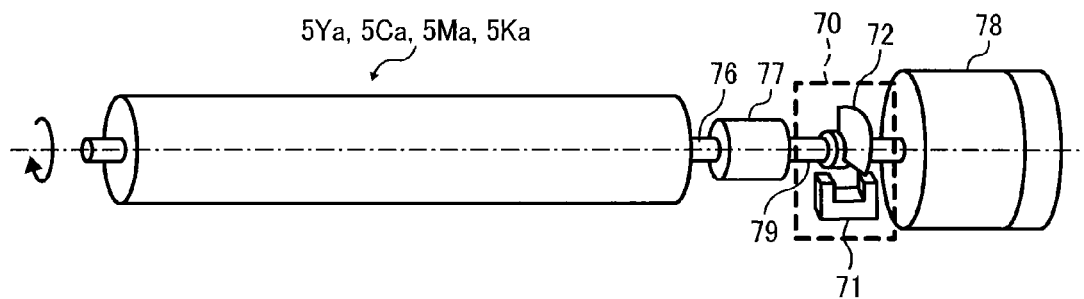
FIG. 14 is a perspective view schematically illustrating the rotational position detector.

With reference to FIG. 14, a description is provided of an example of a rotational position detector for detection of the rotational position of the development rollers 5Ya, 5Ca, 5Ma, and 5Ka, each serving as a developer bearing member. A rotational position detector 70 includes a photo interrupter 71 to detect the rotational position of the development rollers 5Ya, 5Ca, 5Ma, and 5Ka.

The rotational position detector 70 is a home position detector provided to each of the development rollers 5Ya, 5Ca, 5Ma, and 5Ka. The rotational position detectors 70 have the same configuration as shown in FIG. 14. As shown in FIG. 14, a shaft 76, which is a rotation center axis of the development rollers 5Ya, 5Ca, 5Ma, and 5Ka, is connected to an output shaft 79 of a drive motor 78 via a coupling 77, and is rotatably driven by the drive motor 78.

The rotational position detector 70 includes, in addition to the photo interrupter 71, a shield 72 integrally disposed with the output shaft 79. The shield 72 rotates together with rotation of the output shaft 79. In accordance with the rotation of the development rollers 5Ya, 5Ca, 5Ma, and 5Ka, the photo interrupters 71 detect the development rollers 5Ya, 5Ca, 5Ma, and 5Ka when the development rollers 5Ya, 5Ca, 5Ma, and 5Ka come to a predetermined rotational position. Accordingly, the photo interrupters 71 detect the rotational position of the development rollers 5Ya, 5Ca, 5Ma, and 5Ka. Similarly, as described above, the photo interrupters 18Y, 18C, 18M, and 18K detect the rotational position of the photosensitive drums 2Y, 2M, 2C, and 2K, respectively.

In the example shown in FIG. 14, a direct-driving method, in which the drive motor is connected directly to the development rollers 5Ya, 5Ca, 5Ma, and 5Ka, is employed. Alternatively, a decelerator may be disposed in a drive transmission path between the drive motor 78 and the development rollers 5Ya, 5Ca, 5Ma, and 5Ka. In a case in which the decelerator is employed, it is desirable that the shield 72 be disposed on the shaft 76 such that the shield 72 rotates at the same rotational speed as development rollers 5Ya, 5Ca, 5Ma, and 5Ka. The same applies to detection of the rotational position of the photosensitive drums 2Y, 2M, 2C, and 2K.

Figure 15:
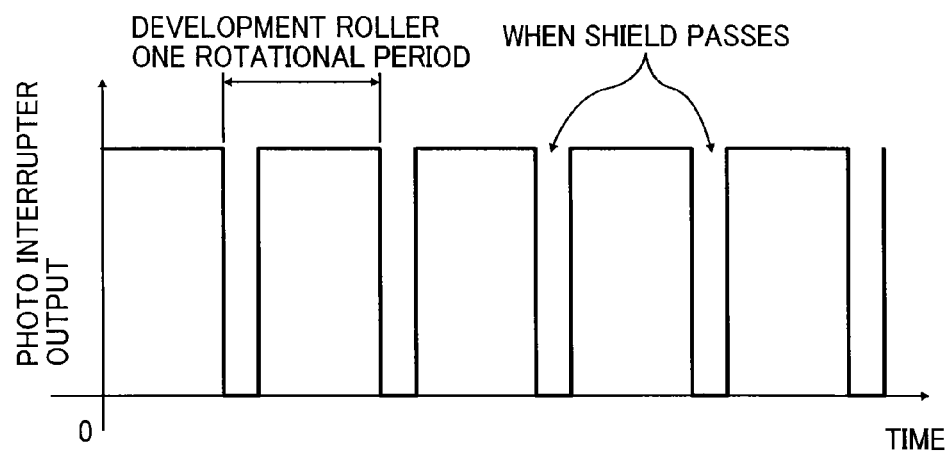
FIG. 15 is a timing chart showing an example of a signal provided by the rotational position detector of FIG. 14.

FIG. 15 illustrates an example of output of the photo interrupter 71. As understood from FIG. 15, the output drops to substantially 0V when the shield 72 rotating in synchronization with the rotation of the development rollers 5Ya, 5Ca, 5Ma, and 5Ka passes the photo interrupter 71. Accordingly, the photo interrupter 71 detects the rotational position of the development rollers 5Ya, 5Ca, 5Ma, and 5Ka using the edge.

Based on the rotational position signal detected by the rotational position detector 70, processing including the data processing, various correction and control similar to or the same as described above is performed.

For example, averaging is performed on the image densities of the first through fourth image patterns detected by the toner image detector 30 based on the signal provided by the photo interrupter 71.

More specifically, based on the signal of the photo interrupter 71, the image densities are correlated with the phase of the development rollers 5Ya, 5Ca, 5Ma, and 5Ka and are averaged on the rotational period of the development rollers 5Ya, 5Ca, 5Ma, and 5Ka by the controller 37 functioning as the image density storage device. The controller 37 functioning as the image density storage device obtains and stores the image density (corresponding to f(t) as described above) correlated with the phase of the photosensitive drums 2Y, 2M, 2C, and 2K. It is explained along with data with reference to FIG. 16.

Figure 16:
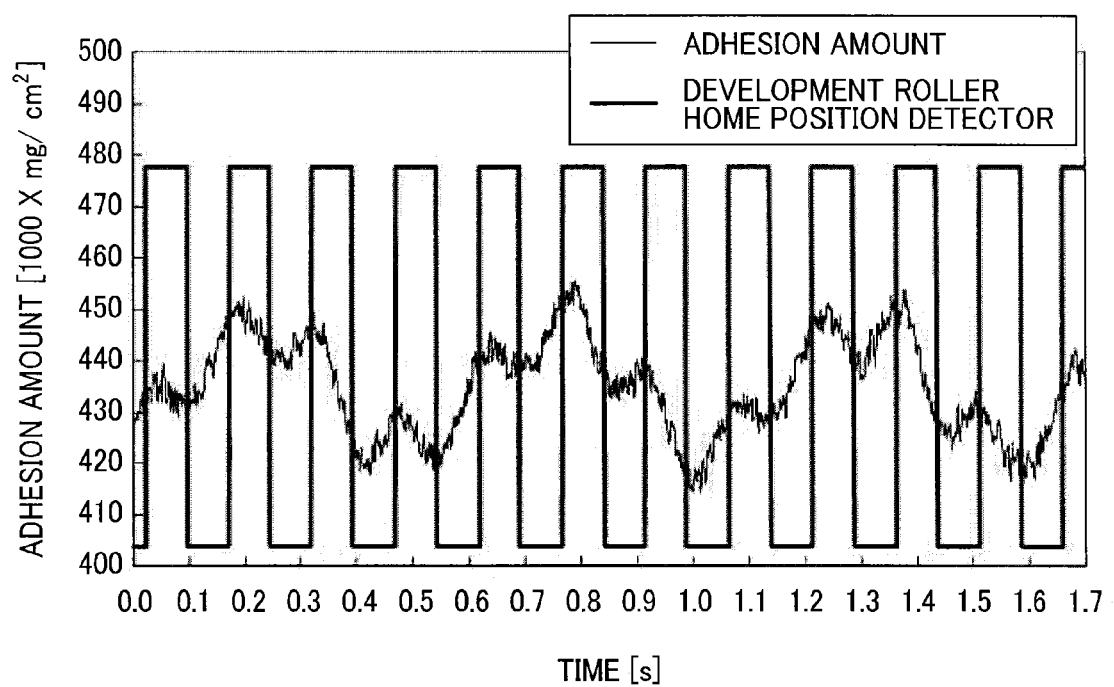
FIG. 16 is a timing chart showing a relation between the signals provided by the rotational position detector of FIG. 14 and the toner adhesion amount detection signals provided by the image density detector.

In FIG. 16, results of measurement of the image density of the image pattern detected by the toner image detector 30 and output signals of the photo interrupter 71 are shown overlappingly in a synchronized state on a horizontal axis on which time is plotted. The toner adhesion amount (mg/cm$^2$*1000) is plotted on a vertical axis.

The description of the image pattern has been provided with reference to FIG. 5. The toner image is detected by the toner image detector 30 and is converted to the toner adhesion amount. As described above, any known adhesion amount conversion algorithm will suffice.

In FIG. 16, the line representing the toner adhesion amount corresponding to the image density forms a substantially inverted V-shape, and the line representing the output of the photo interrupter 71 forms a rectangular shape. The toner adhesion amount shown in FIG. 16 indicates that uneven density is generated periodically in the image pattern corresponding to the rotational period of the development rollers 5Ya, 5Ca, 5Ma, and 5Ka.

The periodic uneven density includes other periodic fluctuation components, for example, noise such as the uneven density due to rotational fluctuation of the photosensitive drums 2Y, 2M, 2C, and 2K.

In view of the above, the image density of the image pattern detected by the toner image detector 30 is segmented by the output signal of the photo interrupter 71 and is averaged. The obtained result is defined as the image density, in other words, correction data associated with the toner adhesion amount. The controller 37 serving as the image density storage device stores the correction data as the time-series image density.

Figure 17A:
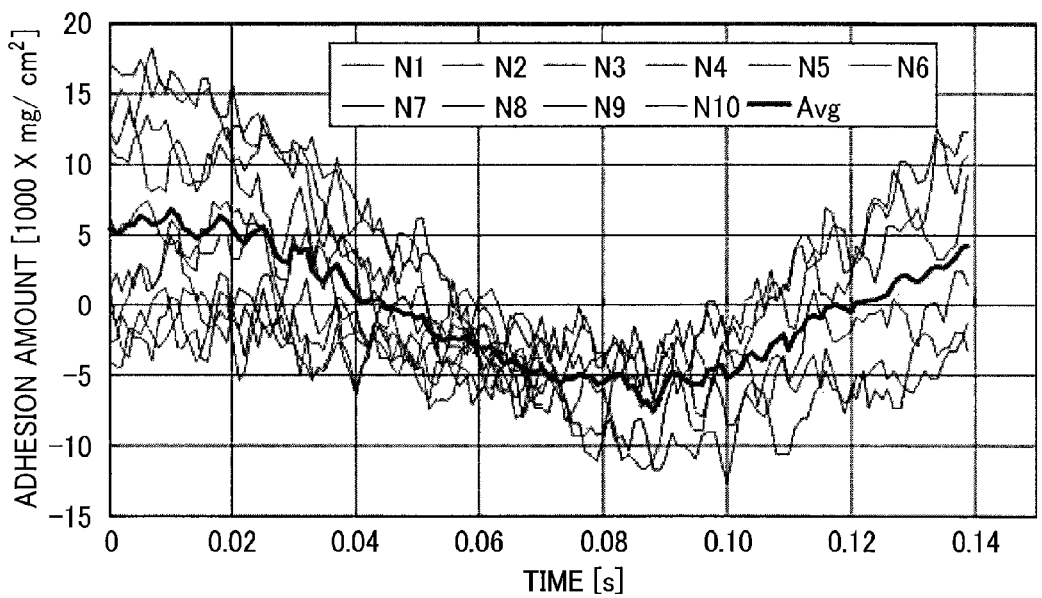
FIGS. 17A and 17B are graphs showing waveforms of toner adhesion amount detected by the image density detector.
Figure 17B:
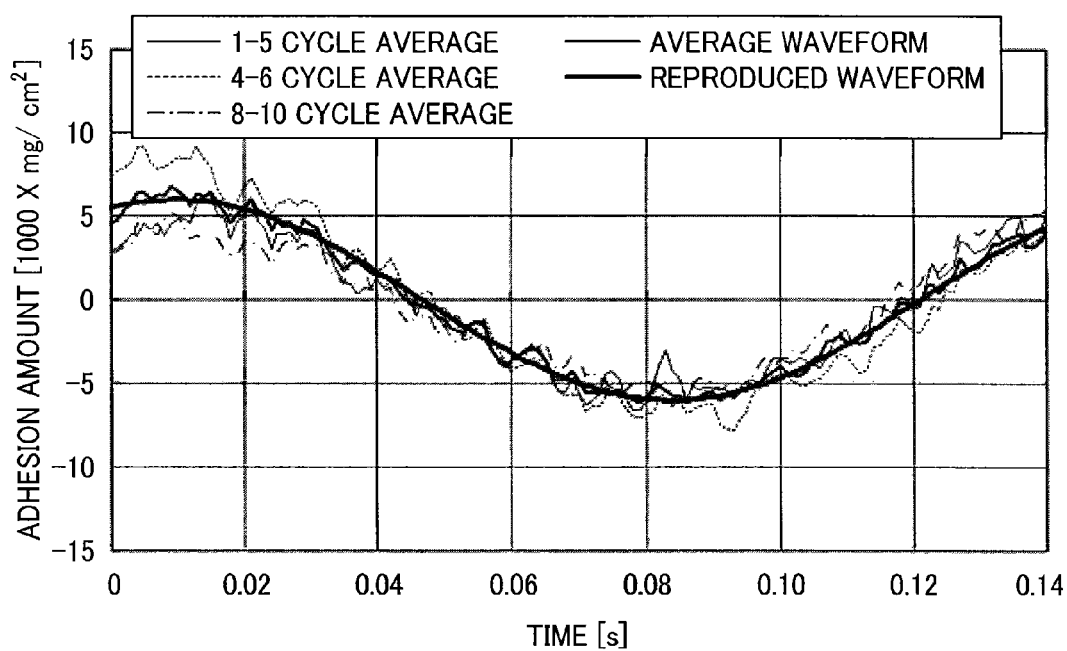

FIGS. 17A and 17B show waveforms of the toner adhesion amount segmented per rotational period of the development rollers 5Ya, 5Ca, 5Ma, and 5Ka. As shown in FIG. 17A, when observing the toner adhesion amount per cycle, waveforms indicated by thin lines N1 through N10 which represent image densities of the image patterns detected by the toner image detector 30 include other periodical fluctuation components and hence move up and down rigorously. As shown in FIG. 17B, however, an original development roller periodic component can be extracted by averaging, the result of which is indicated by a bold line.

As described above, the averaging is performed on the rotational period of the photosensitive drums 2Y, 2M, 2C, and 2K in the same manner. Thus, the photosensitive drum periodic uneven density data and the development roller periodic uneven density data are discussed in this specification as data after averaging.

In the example shown in FIG. 17B, the image density data is obtained for ten cycles from N1 to N10, and the data is selected for five cycles, which is subjected to simple averaging, i.e., arithmetic averaging. Alternatively, the selected data may be subjected to other averaging methods as long as the development roller periodic component is extracted.

In the configuration in which the rotational position of the photosensitive drums 2Y, 2M, 2C, and 2K and the development rollers 5Ya, 5Ca, 5Ma, and 5Ka are detected, two uneven density components are individually extracted from the uneven density of the image pattern. In other words, according to the present illustrative embodiment, the uneven density component derived from the photosensitive drums 2Y, 2M, 2C, and 2K and the uneven density component derived from the development rollers 5Ya, 5Ca, 5Ma, and 5Ka are detected individually.

These components are detected as these components are superimposed on the uneven density of the third image pattern and the fourth image pattern. However, these components can be extracted individually as described above. The amount of correction for each component is superimposed so as to cancel the uneven density. Accordingly, the third condition and the fourth condition are determined.

The length, position, and so forth of the image pattern are set based on the longest circumferential length among the photosensitive drums 2Y, 2M, 2C, and 2K and the development rollers 5Ya, 5Ca, 5Ma, 5Ka, the rotational position, layout distance, and process linear velocity. Generally, the circumferential length of the photosensitive drums 2Y, 2M, 2C, and 2K is longer than that of the development rollers 5Ya, 5Ca, 5Ma, 5Ka. Thus, the length, position, and so forth of the image pattern are set in the same or the similar manner as described above.

In a case in which the control is carried out using the rotational period of the photosensitive drums 2Y, 2M, 2C, and 2K, and the rotational period of the development rollers 5Ya, 5Ca, 5Ma, and 5Ka, the third condition and the fourth condition are determined for each period. Based on each rotational position detector, correction signals are generated, superimposed, and applied to the development bias and the charging bias.

td, which is the first condition and the second condition, employs a value of the shorter rotational period. In this case, it is desirable to employ a value obtained on the rotational period of the development roller. This is because the value obtained on the shorter period has higher calculation accuracy. In a case in which both the rotational period of the photosensitive drums 2Y, 2M, 2C, and 2K and the rotational period of the development rollers 5Ya, 5Ca, 5Ma, and 5Ka are employed, preferably, the phase shift amount td as the first condition and the second condition to be applied to the third condition and the fourth condition is calculated based on the detection results of the rotational position and the rotational period of the development rollers 5Ya, 5Ca, 5Ma, and 5Ka.

In a configuration in which the rotational position of the development rollers 5Ya, 5Ca, 5Ma, and 5Ka is detected, the uneven density component derived from the development rollers 5Ya, 5Ca, 5Ma, and 5Ka is extracted from the uneven density of the third pattern and the fourth pattern, and the third condition and the fourth condition are determined to cancel the uneven density component. The first condition and the second condition determined separately are applied to the third condition and the fourth condition, and the first timing optimization condition and the second timing optimization condition and the first timing optimization data and the second timing optimization data are obtained. Image formation is performed in accordance with the timing optimization condition and the timing optimization data generated by superimposition of the first and the second timing optimization conditions or superimposition of the first timing optimization data and the second timing optimization data.

In this case, the length, position, and so forth of the first image pattern and the second image pattern are set based on the circumferential length, rotational position, layout distance, and process linear velocity of the development rollers 5Ya, 5Ca, 5Ma, 5Ka.

Here, the layout distance refers to the distance in the sub-scanning direction between the development nip and the detection position of the image pattern detected by the toner image detector 30.

The first image pattern and the second image pattern are formed at the image pattern formation timing based on the rotational position of the development rollers 5Ya, 5Ca, 5Ma, 5Ka. The rotational position of the development rollers 5Ya, 5Ca, 5Ma, and 5Ka is detected by the photo interrupter 71.

In terms of timing of formation of image patterns, either the rotational position of the photosensitive drums 2Y, 2M, 2C, and 2K, and the rotational position of the development rollers 5Ya, 5Ca, 5Ma, and 5Ka is obtained. In order to obtain the rotational position, one of the photo interrupters 18Y, 18C, 18M, and 18K, and the photo interrupter 71 is disposed. That is, the rotators to form the image patters, the density of which is detected by the toner image detector 30, are either the photosensitive drums 2Y, 2M, 2C, and 2K or the development rollers 5Ya, 5Ca, 5Ma, and 5Ka.

As described above, in the present illustrative embodiment, the amount of phase lag is detected using a halftone image as the first image pattern and the second image pattern. In order to detect the amount of the phase lag with precision, preferably, the original image patterns are not influenced by the uneven density.

Figure 18:
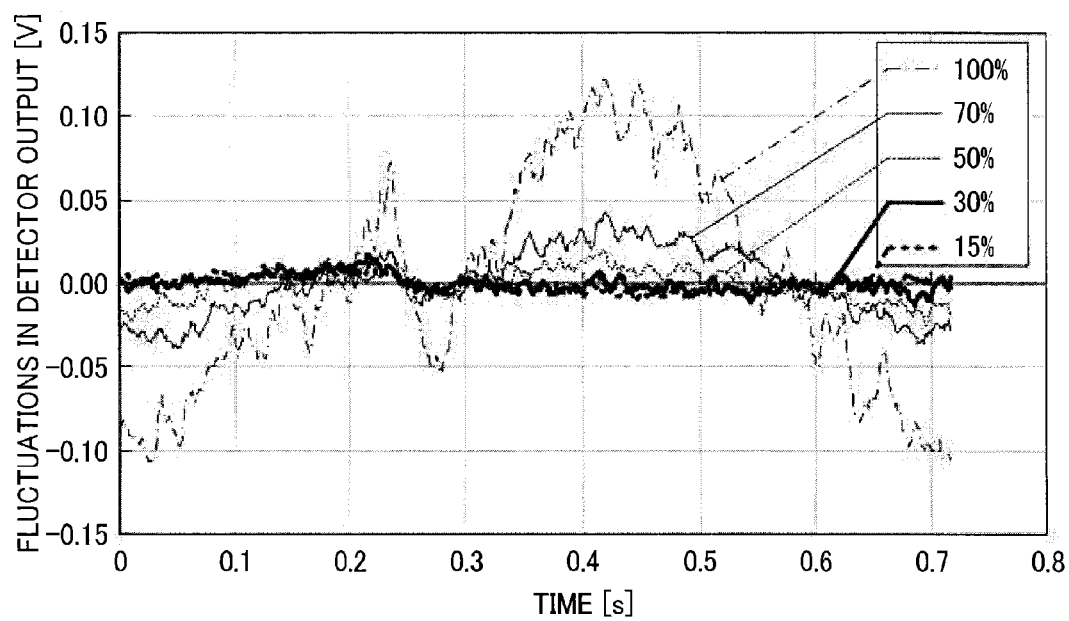
FIG. 18 is a graph showing a relation between the image density and uneven density.

FIG. 18 illustrates the relation between the image density of the input image density and uneven density.

In this example, a band image pattern such as shown in FIG. 5 is detected by the density detector such as the toner image detector 30 and is averaged by several cycles of the photosensitive drum based on the rotational detector such as the photo interrupters 18Y, 18C, 18M, and 18K.

The diameter of the photosensitive drum in the experiment is approximately $\phi$ 100 mm. In the present experiment, the process linear velocity is approximately 440 mm/s, the charging power is $-700$ V, the development power is $-500$ V, and the LD power is 70% (when forming a solid image). A band image pattern is formed in the color of cyan with the density in a range of 100% to 15%, and the band image patterns for five cycles of the photosensitive drum is averaged. In FIG. 18, a waveform noted as 100% represents uneven density of a band image pattern of 100% cyan solid image. Other waveforms represent uneven density of different image density of cyan band patterns formed in the same manner except for the conditions described above and the exposure conditions.

As understood from FIG. 18, as the image density increases, that is, with the higher image density, the amplitude of uneven density is relatively large. Therefore, if the first image pattern and the second image pattern are formed with high image density, the calculation accuracy decreases due to the influence of the uneven density. When the first image pattern and the second image pattern are formed while the development bias or the charging bias is changed and are detected by the density detector to measure the delay attributed to the delay in the output of the high-voltage power pack and parts variations, other than the layout distance, the following difficulty may arise. That is, if the first image pattern and the second image pattern are formed with high image density, uneven density caused by fluctuations of the gap affects the image patterns and hence reduces reliability of the measured value for calculation of the phase lag.

In obtaining the amount of the phase lag, in order to avoid the influence of original uneven density, that is, uneven density of the image pattern, an amplitude of changing the image formation conditions may be large. However, with a large amplitude of the development bias, fluctuation of the background potential causes undesirable toner/carrier adherence to a non-image portion, which may occur periodically. Thus, this is not realistic.

In view of the above, in the present illustrative embodiment, the first image pattern and the second image pattern are halftone images which are less influenced by the uneven density relative to the gap fluctuation.

Figure 19A:
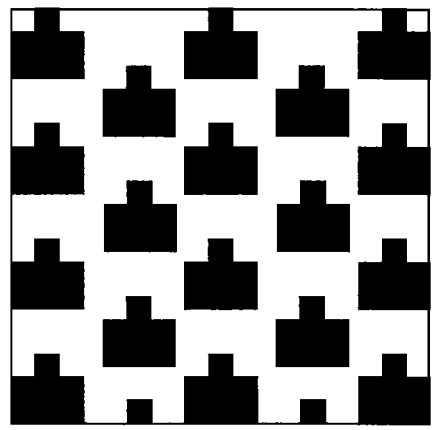
FIGS. 19A through 19C are partially enlarged diagrams schematically illustrating examples of halftone patterns.
Figure 19B:
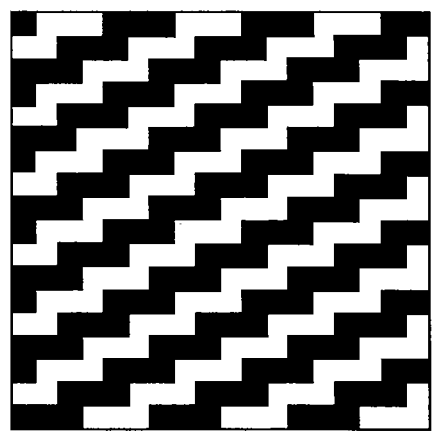
Figure 19C:
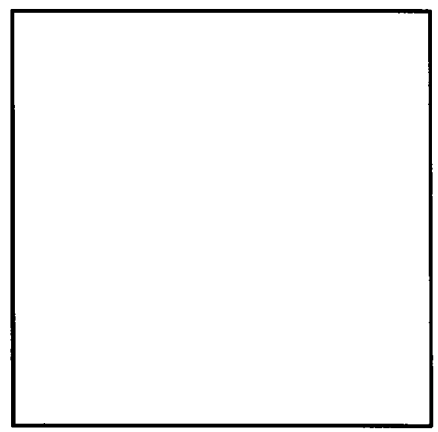

FIGS. 19A through 19C illustrate examples of the halftone images constituting the first image pattern and the second image pattern.

FIG. 19A illustrates a halftone pattern constituted of a dot-shaped area coverage modulation pattern. FIG. 19B illustrates a halftone pattern constituted of a line-shaped area coverage modulation pattern. In FIGS. 19A and 19B, black areas indicate exposure areas exposed by the exposure device per unit pixel, and toner is adhered thereto. Such a gradation expression is called an area coverage modulation pattern in which, as illustrated in FIGS. 19A and 19B, an area ratio of an exposure area and that of a non-exposure area are changed according to the input image density, that is, the ratio of the exposure area of the photosensitive drum is changed. The first image pattern and the second image pattern are obtained by changing the exposure area in such a manner.

FIG. 19C illustrates an example of a halftone image which is formed as a duty and a bias are changed. This halftone image is formed such that as illustrated in FIGS. 20A and 20B the image formation conditions are set so as to obtain a smaller development potential than the development potential obtained under the normal image formation conditions.

Figure 20A:
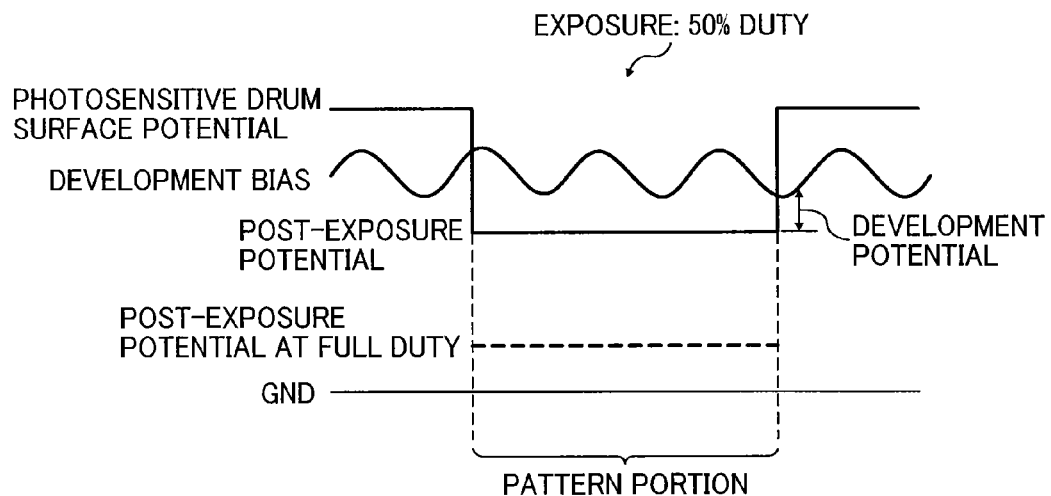
FIGS. 20A and 20B are graphs schematically illustrating a relation between a development potential and image forming conditions.
Figure 20B:
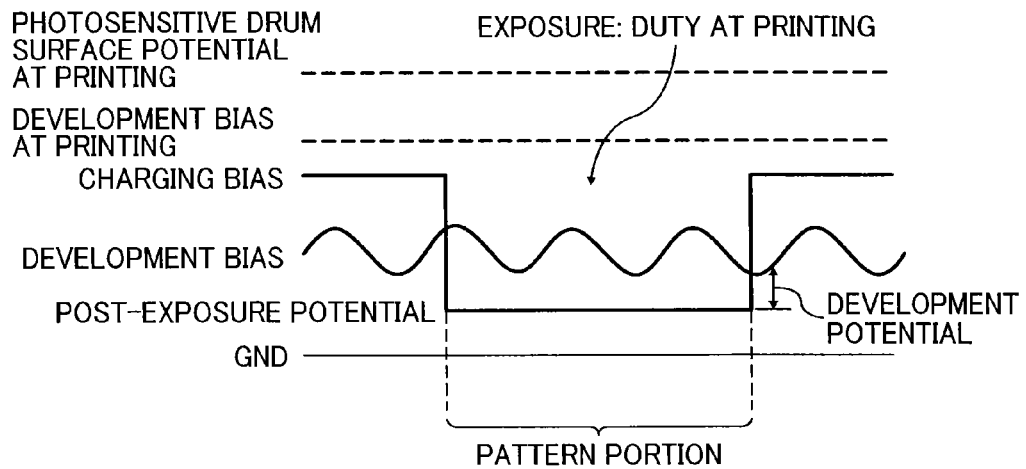

FIGS. 20A and 20B illustrate examples in which the development bias is modulated on the photosensitive drum period or the development roller period.

More specifically, FIG. 20A illustrates an example in which a potential of the photosensitive drum after exposure is relatively high by adjusting the exposure intensity (Duty) of the exposure device to be lower than that in the normal printing conditions. With a relatively small development potential, a halftone pattern having a low density entirely is formed. FIG. 20B illustrates an example in which the halftone pattern is formed by the same principle as FIG. 20A such that the exposure intensity (Duty) of the exposure device is the same as during printing, and the development bias and the charging bias are set to be lower than during printing.

The degree of change in the development bias and the charging bias for detecting the change in the density of the first image pattern and the second image pattern is set so that the development potential is obtained, more specifically, the first image pattern and the second image pattern are halftone patterns. Therefore, the degree of change in the development bias and the charging bias for obtaining the development potential is equal to or less than the difference between the electrical potential and the development bias upon formation of the third image pattern and the fourth image pattern or formation of a normal image designated by a user, that is, an output image.

The image area of the first image pattern and the second image pattern is in a range of from 15% to 70%, preferably approximately 40%, where the image area of a solid image is 100. In the present illustrative embodiment, the image area is 40%. The image area of the fourth image pattern is also 40%.

According to the present illustrative embodiment, the image density of the first image pattern and the second image pattern is approximately 40%, and the amplitude (Amp.1) of the development bias and the charging bias is approximately 50V. The development bias and the charging bias are modulated on the rotational period of the development rollers 5Ya, 5Ca, 5Ma, and 5Ka, and the phase lag is measured.

At least one of the controller 37 and the nonvolatile memory and/or the volatile memory functions as an image forming program storage device. The image forming program includes an image density control program to execute the image density control method when the timing correction data obtained by the controller 37 serving as a density correction controller is applied. The image forming program can be stored not only in the nonvolatile memory and/or the volatile memory of the controller 37, but also in semiconductor media (for example, random access memory (RAM) and nonvolatile semiconductor memory), optical media (for example, digital versatile disc (DVD), magneto-optical (MO) disc, mini disc (MD), and compact disc recordable (CD-R)), magnetic media (for example, hard disk, magnetic tape, and flexible disc), and other storage media. Any of the above-described memories and storage media storing the image forming program form a computer-readable recording medium storing the program.

With the configuration described above, the delay attributed to the actual output of the high-voltage power pack and parts variations, other than the theoretical layout distance is measured with precision without getting influenced by uneven density relative to rotational fluctuations, thereby enhancing uneven density correction effect when the development bias, the charging bias, and the exposure intensity as needed are modulated on the rotational period of the rotators.

Although the embodiments of the present disclosure have been described above, the present disclosure is not limited to the foregoing embodiments, but a variety of modifications can naturally be made within the scope of the present disclosure.

For example, in the illustrative embodiment described above, a plurality of elements to be controlled is provided to obtain uniform image density. A plurality of image forming devices is provided to form an image using the plurality of elements, and multiple timing correction data corresponding to each element is obtained. Alternatively, one element, one image forming device, and one timing correction data may be provided. Therefore, one of the third condition and the fourth condition may be employed. Accordingly, one of the first condition and the second condition is employed. In this case, one of the first timing optimization condition and the second timing optimization condition serves as the timing optimization condition, and one of the first timing optimization data and the second timing optimization data serves as the timing optimization data.

The present disclosure is applicable to an image forming apparatus such as a copier, a printer, a facsimile machine, a plotter, a color digital multifunction machine capable of forming full-color images by combining at least two of the functions of these apparatuses, and a multifunction machine combining at least two of the functions of the apparatuses (e.g., combination of a copier and a printer). There is growing market demand for image forming apparatuses capable of forming color images, such as color copiers and color printers. However, the present disclosure is not limited to color image forming apparatuses, but is also applicable to image forming apparatuses which only form monochromatic images.

Preferably, the image forming apparatus according to the present disclosure is capable of forming an image on a sheet-shaped recording medium (also referred to as a recording material, a recording sheet, or a transfer sheet, for example) including not only plain paper commonly used for copying but also an overhead projector (OHP) sheet, a relatively thick sheet such as a card and a postcard, and an envelope, for example. Further, the image forming apparatus also includes a single side image forming apparatus capable of forming images on one side and a duplex image forming apparatus capable of forming images on both surfaces of the recording medium. Further, the developer used in the image forming apparatus is not limited to the two-component developer, and may be a one-component developer.

According to the present disclosure, an image forming apparatus includes an image bearing member, a developer bearing member, a developer bearing member, an image density detector, an image forming device, a rotator, an image density controller, and a timing correction data obtainer. The image bearing member bears an image on a surface thereof. The developer bearing member supplies toner to the image on the image bearing member to develop the image with toner. The image density detector detects a density of toner in the image. The image forming device forms the image using a density adjustable element that adjusts the density of the image. The rotator forms an image pattern while the density adjustable element is changed, and a density of the image pattern is detected by the image density detector. The image density controller controls the mage forming device using a density correction data for the density adjustable element corresponding to a rotational period of the rotator to obtain a uniform image density. The timing correction data obtainer obtains timing correction data for correction of driving timing of the image forming device based on a change in the density of the image pattern detected by the image density detector. As the image forming device is controlled by the image density controller using the density correction data, the density correction data is in a state in which the timing correction data obtained by the timing correction data obtainer is applied thereto.

With this configuration, the correction data for the uneven density corresponding to the rotational period of the rotator can be applied accurately so as to eliminate the uneven density, thereby allowing high-precision correction of the uneven density.

According to an aspect of this disclosure, the present disclosure is employed in the image forming apparatus. The image forming apparatus includes, but is not limited to, an electrophotographic image forming apparatus, a copier, a printer, a facsimile machine, and a digital multi-functional system.

Furthermore, it is to be understood that elements and/or features of different illustrative embodiments may be combined with each other and/or substituted for each other within the scope of this disclosure and appended claims. In addition, the number of constituent elements, locations, shapes and so forth of the constituent elements are not limited to any of the structure for performing the methodology illustrated in the drawings.

Still further, any one of the above-described and other exemplary features of the present invention may be embodied in the form of an apparatus, method, or system.

For example, any of the aforementioned methods may be embodied in the form of a system or device, including, but not limited to, any of the structure for performing the methodology illustrated in the drawings.

Each of the functions of the described embodiments may be implemented by one or more processing circuits. A processing circuit includes a programmed processor, as a processor includes a circuitry. A processing circuit also includes devices such as an application specific integrated circuit (ASIC) and conventional circuit components arranged to perform the recited functions.

Example embodiments being thus described, it will be obvious that the same may be varied in many ways. Such exemplary variations are not to be regarded as a departure from the scope of the present invention, and all such modifications as would be obvious to one skilled in the art are intended to be included within the scope of the following claims.

What is claimed is:

1. An image forming apparatus, comprising:
    an image bearing member to bear an image on a surface thereof;
    a developer bearing member to supply toner to the image on the image bearing member to develop the image with toner;
    an image density detector to detect a density of toner in the image;
    an image forming device to form the image using a density adjustable element that adjusts the density of the image;
    a rotator to form an image pattern while the density adjustable element is changed, a density of the image pattern being detected by the image density detector;
    an image density controller to control the image forming device using a density correction data for the density adjustable element corresponding to a rotational period of the rotator to obtain a uniform image density; and
    a timing correction data obtainer to obtain timing correction data for correction of driving timing of the image forming device based on a change in the density of the image pattern detected by the image density detector,
    wherein as the image forming device is controlled by the image density controller using the density correction data, the density correction data is in a state in which the timing correction data obtained by the timing correction data obtainer is applied thereto.

2. The image forming apparatus according to claim 1, wherein the density adjustable element comprises at least one of a development bias applied between the image bearing member and the developer bearing member, and a charging bias to charge the image bearing member.

3. The image forming apparatus according to claim 2, wherein a degree of change in the density adjustable element for detecting the change in the density of the image pattern by the image density detector is set so as to obtain a development potential.

4. The image forming apparatus according to claim 2, wherein a degree of change in the density adjustable element for detecting the change in the density of the image pattern by the image density detector is equal to or more than ±30 V and equal to or less than ±100V.

5. The image forming apparatus according to claim 1, wherein the rotator comprises a plurality of rotators having different rotational periods, and the timing correction data obtainer obtains the timing correction data based on the change in the density of the image pattern corresponding to the smallest rotational period among the plurality of rotators.

6. The image forming apparatus according to claim 1, further comprising:
    a plurality of the image forming devices,
    wherein the timing correction data obtainer obtains the timing correction data for the density correction data for each density adjustable element based on the change in the density of image patterns which are formed while changing the density adjustable element for each of the plurality of the image forming devices and detected by the image density detector.

7. The image forming apparatus according to claim 1, wherein the image pattern is a halftone pattern.

8. The image forming apparatus according to claim 7, wherein the image pattern is an area coverage modulation pattern formed by adjusting a ratio of exposure area of the image bearing member.

9. The image forming apparatus according to claim 7, wherein the halftone pattern is formed by adjusting an exposure intensity of the image bearing member.

10. The image forming apparatus according to claim 7, wherein the halftone pattern is formed by adjusting at least one of a development bias and a charging bias applied between the image bearing member and the developer bearing member.

11. An image forming method, comprising:
    bearing an image;
    bearing and supplying toner to the image;
    detecting a density of toner in the image;
    forming the image using a density adjustable element that adjusts the density of the image;
    forming an image pattern on a rotator while the density adjustable element is changed, a density of the image pattern being detected by the detecting;
    controlling the forming the image using density correction data for the density adjustable element corresponding to a rotational period of the rotator to obtain a uniform image density; and
    obtaining timing correction data for correction of driving timing of the forming the image based on a change in the density of the image pattern detected by the detecting,
    wherein as the forming the image is controlled by the controlling using the density correction data, the density correction data is in a state in which the timing correction data obtained by the obtaining is applied thereto.

* * * * *